US012160354B2

(12) United States Patent
 Chakraborty et al.

(10) Patent No.: US 12,160,354 B2
(45) Date of Patent: *Dec. 3, 2024

(54) METHODS AND APPARATUS FOR CAPTURING AND/OR USING PACKETS TO FACILITATE FAULT DETECTION

(71) Applicant: Juniper Networks, Inc., Sunnyvale, CA (US)

(72) Inventors: Sourav Chakraborty, Fremont, CA (US); Deanna Sue Hong, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,242

(22) Filed: Sep. 5, 2023

(65) Prior Publication Data

US 2024/0073115 A1    Feb. 29, 2024

Related U.S. Application Data

(63) Continuation of application No. 17/657,043, filed on Mar. 29, 2022, now Pat. No. 11,770,314, which is a
(Continued)

(51) Int. Cl.
*H04L 43/04* (2022.01)
*H04L 41/0654* (2022.01)
(Continued)

(52) U.S. Cl.
CPC .......... *H04L 43/04* (2013.01); *H04L 41/0654* (2013.01); *H04L 41/0677* (2013.01);
(Continued)

(58) Field of Classification Search
CPC . H04L 43/04; H04L 41/0654; H04L 41/0677; H04L 49/252; H04L 41/0681;
(Continued)

(56) References Cited

U.S. PATENT DOCUMENTS 5,315,580 A    5/1994 Phaal
7,020,082 B2   3/2006 Bhagavath et al.
(Continued)

FOREIGN PATENT DOCUMENTS

AU    2017361095 A1   5/2019
CA       3044045 A1   5/2018
(Continued)

OTHER PUBLICATIONS

"Chinese Application Serial No. 201780080603.9, Voluntary Amendment filed Jan. 23, 2020", w/ English Claims, 15 pgs.
(Continued)

*Primary Examiner* — Ashley Shivers
(74) *Attorney, Agent, or Firm* — Shumaker & Sieffert, P.A.

(57) ABSTRACT

Methods and apparatus for controlling monitoring operations performed by various devices, e.g., access points, in a communications network and for using information obtained by the devices which perform the monitoring are described. The methods are well suited for use in a system with a variety of access points, e.g., wireless and/or wired access points, which can be used to obtain access to the Internet or another network. An access point, which has been configured to monitor in accordance with received monitoring configuration information, e.g. on a per access point interface basis, captures packets, stores captured packets, and monitors to detect communications failures corresponding to communications devices using said access point. In response to detecting a communications failure, the access point generates, an event failure notification indicating the type of detected failure and sends the event failure notification to the network monitoring node along with corresponding captured packets.

19 Claims, 14 Drawing Sheets

Related U.S. Application Data continuation of application No. 16/885,951, filed on May 28, 2020, now Pat. No. 11,323,341, which is a continuation of application No. 16/264,649, filed on Jan. 31, 2019, now Pat. No. 10,715,408, which is a continuation of application No. 15/352,511, filed on Nov. 15, 2016, now Pat. No. 10,257,750.

(51) Int. Cl.
| | |
|---|---|
| *H04L 41/0677* | (2022.01) |
| *H04L 49/25* | (2022.01) |
| *H04W 28/18* | (2009.01) |
| *H04W 28/24* | (2009.01) |
| *H04W 36/30* | (2009.01) |
| *H04W 76/18* | (2018.01) |
| *H04L 41/0681* | (2022.01) |

(52) U.S. Cl.
CPC ........... *H04L 49/252* (2013.01); *H04W 28/18* (2013.01); *H04W 28/24* (2013.01); *H04W 36/305* (2018.08); *H04W 76/18* (2018.02); *H04L 41/0681* (2013.01)

(58) Field of Classification Search
CPC ... H04L 43/028; H04L 43/0823; H04L 43/12; H04W 28/18; H04W 28/24; H04W 36/305; H04W 76/18
See application file for complete search history.

(56) References Cited

U.S. PATENT DOCUMENTS

| | | | |
|---|---|---|---|
| 7,152,179 | B1 | 12/2006 | Critchfield |
| 7,302,269 | B1 | 11/2007 | Crawford et al. |
| 7,702,775 | B2 | 4/2010 | Kuan et al. |
| 7,907,515 | B2 | 3/2011 | Fukasawa |
| 8,780,732 | B2 | 7/2014 | Song et al. |
| 8,948,016 | B2 | 2/2015 | Kruglick |
| 10,257,750 | B2 | 4/2019 | Chakraborty et al. |
| 10,715,408 | B2 | 7/2020 | Chakraborty et al. |
| 11,323,341 | B2 | 5/2022 | Chakraborty et al. |
| 2002/0061748 | A1 | 5/2002 | Nakakita et al. |
| 2005/0144505 | A1* | 6/2005 | Takeuchi ............ H04L 41/0677 714/4.12 |
| 2006/0209699 | A1 | 9/2006 | Tamura et al. |
| 2007/0124458 | A1 | 5/2007 | Kumar |
| 2007/0230332 | A1 | 10/2007 | Fukasawa |
| 2008/0039119 | A1 | 2/2008 | Crawford et al. |
| 2008/0155052 | A1 | 6/2008 | Ramesh |
| 2009/0216871 | A1 | 8/2009 | Ouchi |
| 2009/0274060 | A1 | 11/2009 | Taylor |
| 2013/0078993 | A1 | 3/2013 | Okino et al. |
| 2013/0347103 | A1 | 12/2013 | Veteikis et al. |
| 2015/0043373 | A1 | 2/2015 | Wu |
| 2015/0113112 | A1 | 4/2015 | Nan et al. |
| 2017/0111811 | A1 | 4/2017 | Szymanik et al. |
| 2017/0207990 | A1 | 7/2017 | Curtin et al. |
| 2018/0139086 | A1 | 5/2018 | Chakraborty et al. |
| 2019/0166522 | A1 | 5/2019 | Chakraborty et al. |
| 2022/0224613 | A1 | 7/2022 | Chakraborty et al. |

FOREIGN PATENT DOCUMENTS

| | | |
|---|---|---|
| CN | 1433615 A | 7/2003 |
| CN | 1701569 A | 11/2005 |
| CN | 101079741 A | 11/2007 |
| CN | 101436993 A | 5/2009 |
| CN | 101621429 A | 1/2010 |
| CN | 101945112 A | 1/2011 |
| CN | 101978720 A | 2/2011 |
| CN | 102065451 A | 5/2011 |
| CN | 103069748 A | 4/2013 |
| CN | 110115057 A | 8/2019 |
| JP | 2019536397 A | 12/2019 |
| WO | 2018093916 A1 | 5/2018 |

OTHER PUBLICATIONS

"European Application Serial No. 17872423.3, Extended European Search Report mailed Jun. 19, 2020", 9 pgs.

"European Application Serial No. 17872423.3, Response to Communication pursuant to Rules 161(2) and 162 EPC filed Dec. 20, 2019", 10 pgs.

"International Application Serial No. PCT/US2017/061822, International Preliminary Report on Patentability mailed May 31, 2019", 6 pgs.

"International Application Serial No. PCT/US2017/061822, International Search Report mailed Feb. 21, 2018", 2 pgs.

"International Application Serial No. PCT/US2017/061822, Written Opinion mailed Feb. 21, 2018", 4 pgs.

Extended Search Report from counterpart European Application No. 22154851.4 dated May 9, 2022, 12 pp.

First Office Action and Search Report, and translation thereof, from counterpart Chinese Application No. 201780080603.9 dated Jan. 28, 2022, 14 pp.

Notice of Allowance from U.S. Appl. No. 17/657,043 dated May 12, 2023, 10 pp.

Notice of Intent to Grant and Text Intended to Grant from counterpart European Application No. 17872423.3 dated Sep. 15, 2021, 66 pp.

Notice of Intent to Grant from counterpart Chinese Application No. 201780080603.9 dated Jul. 26, 2022, 7 pp.

Office Action, and translation thereof, from counterpart Chinese Application No. 201780080603.9 dated May 13, 2022, 12 pp.

Prosecution History from U.S. Appl. No. 15/352,511, now issued U.S. Pat. No. 10,257,750, dated Aug. 23, 2018 through Feb. 11, 2019, 49 pp.

Prosecution History from U.S. Appl. No. 16/264,649, now issued U.S. Pat. No. 10,715,408, dated Sep. 3, 2019 through Jun. 10, 2020, 155 pp.

Prosecution History from U.S. Appl. No. 16/885,951, now issued U.S. Pat. No. 11,323,341, dated Jan. 5, 2022 through Mar. 29, 2022, 12 pp.

Response to Extended Search Report dated May 9, 2022, from counterpart European Application No. 22154851.4 filed Dec. 8, 2001, 31 pp.

Notice of Intent to Grant and Text Intended to Grant from counterpart European Application No. 22154851.4 dated Jul. 15, 2024, 129 pp.

* cited by examiner

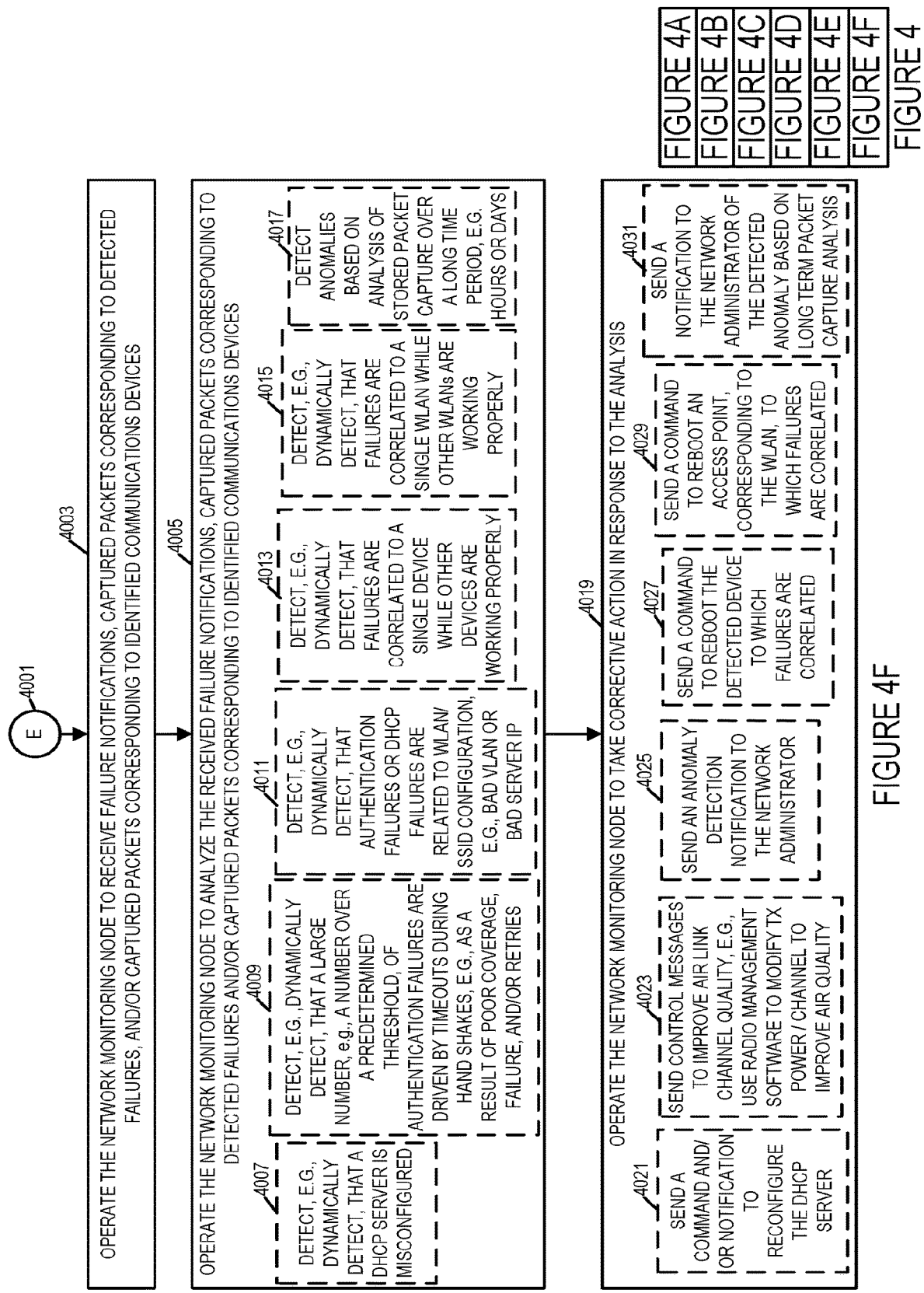

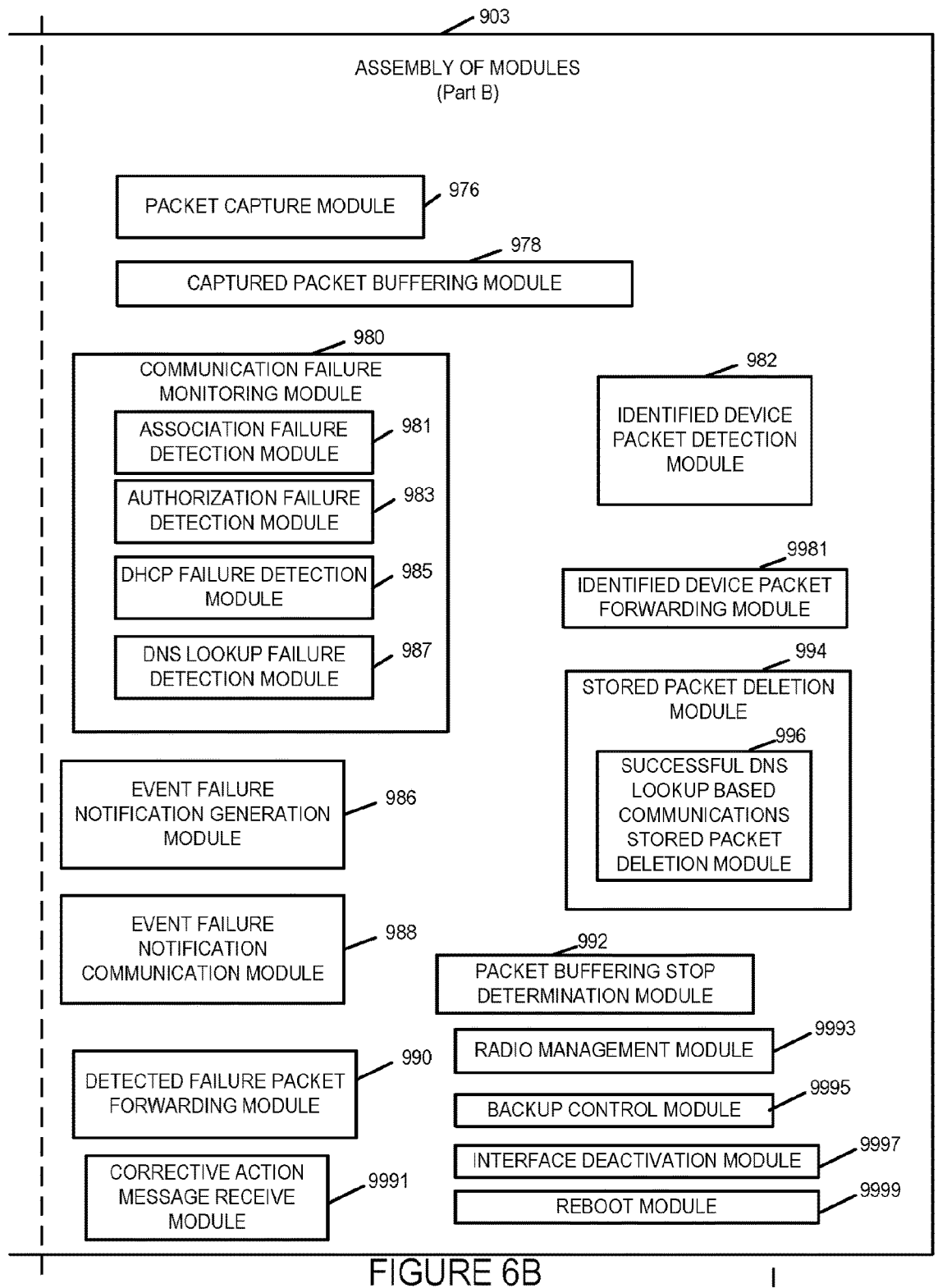

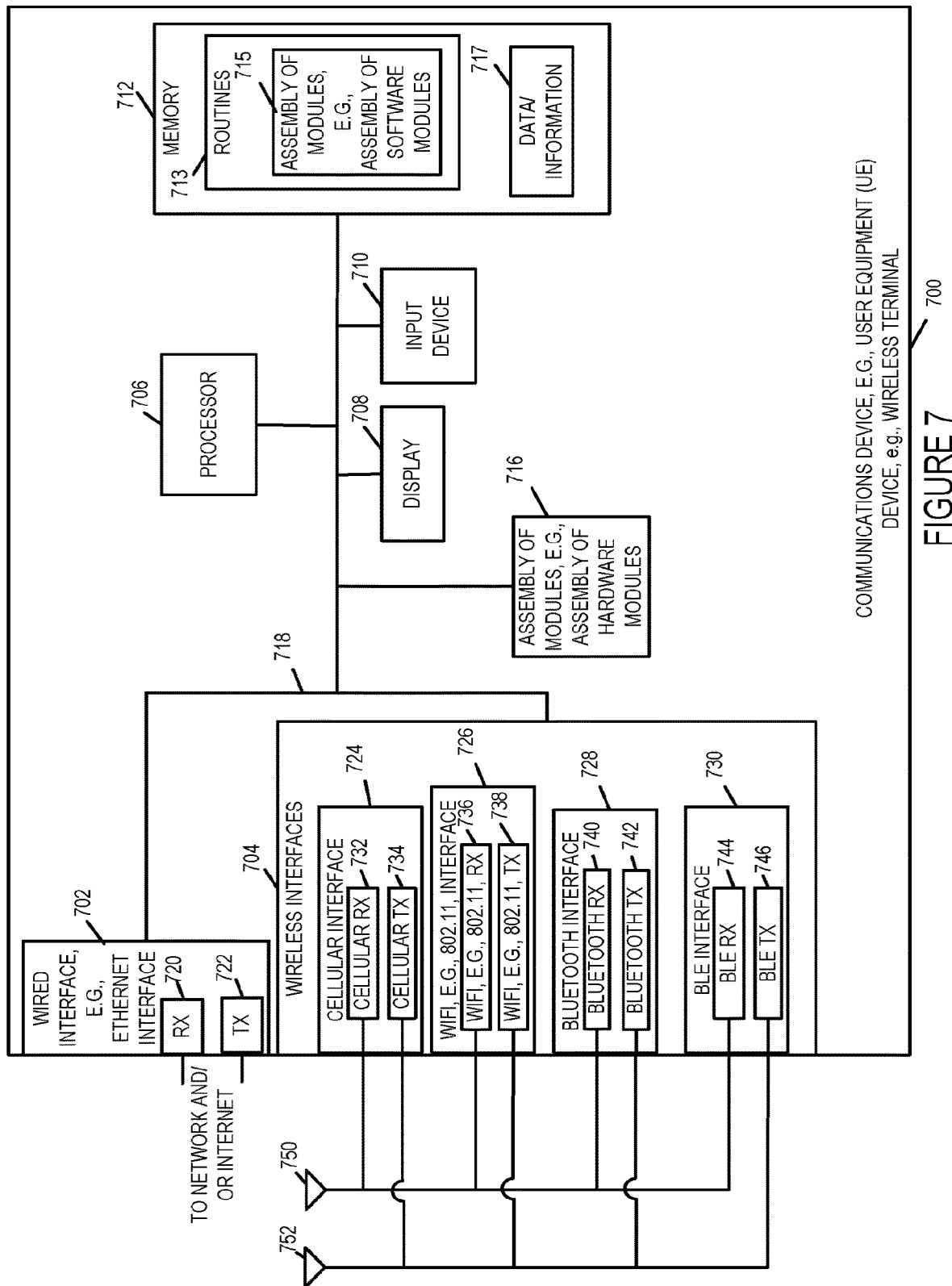

METHODS AND APPARATUS FOR CAPTURING AND/OR USING PACKETS TO FACILITATE FAULT DETECTION

This application is a continuation of U.S. patent application Ser. No. 17/657,043, filed 29 Mar. 2022, now U.S. Pat. No. 11,770,314, which is a continuation of U.S. patent application Ser. No. 16/885,951, filed 28 May 2020, now U.S. Pat. No. 11,323,341, which is a continuation of U.S. patent application Ser. No. 16/264,649, filed 31 Jan. 2019, now U.S. Pat. No. 10,715,408, which is a continuation of U.S. patent application Ser. No. 15/352,511, filed 15 Nov. 2016, now U.S. Pat. No. 10,257,750, each of which is incorporated by reference herein in its entirety.

FIELD

The present application relates to wireless communications and, more particularly, to methods and/or apparatus for capturing packets and/or other information which can be used to facilitate fault detection and/or correction in a wireless communications network.

BACKGROUND

In the current wireless networking world, client complaints are usually the trigger for setting up packet capture at a wireless access point. In such a case, a customer has already suffered to the point of finding it necessary or worth the effort to report a problem to the service provider.

The service provider may respond to the complaint by setting up special packet capture and debug modules which control an access point to capture all packets and subject them to one or more debug procedures in an attempt to identify a problem at the specific access point associated with the customer complaint. Such an approach may result in the detection of recurring problems but may not definitively explain what was the source of the original complaint. This is because such post complaint packet capture collects packets communicated after the initial problem and not packets corresponding to the time of the initial problem or immediately preceding the reported problem, which, if available, might have been useful in determining the cause of the customer's complaint so that corrective measures could be taken.

Thus, while configuring packet capture in response to a complaint from a specific user may be useful, the fact that the customer had to complain about a service problem before action can be taken can lead to a disgruntled customer. Furthermore configuring an access point to capture and report all packets for debugging can involve the capture and communication of a large amount of data even though much of the traffic may have nothing to do with the reported problem.

While it may be possible to detect the source of some problems by capturing and studying packets at a single access point, some problems may involve excessive handoffs between access points and/or different interfaces. From the perspective of one interface there may seem to be no communications problem and a user may be able to communicate successfully for a brief period of time. However because of repeated handoffs or for other reasons, which do not appear as communications failures to an individual access point, a communications session may be dropped or subjected to undesirable interruptions which are unsatisfactory to a user of a particular wireless terminal. While a particular device may encounter problems because of individual device settings, other devices may not encounter such problems, and such problems may not appear as communications failures or problems to the access points servicing the wireless terminal encountering the communications problem. This can be particularly the case with devices which support multiple communications modes of operation and handoffs may occur from an interface using one communications technology to an interface which uses another communications technology.

In view of the above discussion it should be appreciated that there is a need for methods and apparatus which would allow for detection of communications problems before the reporting of complaints by individual customers and the collection of information which would allow the source of the failures to be determined rather than simply the source of future failures. There is also a need for methods and apparatus that would allow for the detection and/or diagnosing of problems which may interfere with the quality of service provided to a customer but which may not appear to be a communications failure from the perspective of an individual communications interface or access point.

SUMMARY

The present application is directed to methods and apparatus for controlling monitoring operations performed by various devices in a communications network, e.g., wired or wireless devices and for using information obtained by the devices which perform the monitoring. The methods are well suited for use in a system with a variety of access points, e.g., wireless and/or wired access points, which can be used to obtain access to the Internet or another network.

User equipment (UE) devices, e.g., cell phones, laptops, etc. can connect through a wireless access point or a wired access point to the Internet or another network using one or a variety of network interfaces. For example, an UE device may connect to the Internet via a wireless interface such as a WiFi (802.11) interface, a Long Term Evolution (LTE) interface, a Bluetooth interface, or another wireless interface. In addition or alternatively the UE device may connect to the Internet via a wired interface such as an Ethernet interface. In fact, a UE device may, and in some embodiments does, support connectivity through multiple interfaces and may switch between interfaces. Thus a UE device may connect to the Internet and communicate with a device on the Internet, e.g., as part of a communications session or other communication, in a variety of ways.

Devices, particularly multi-mode devices, may have conflicting settings and/or configuration issues which interfere with achieving Internet connectivity particularly when attempting to connect to a new access point, e.g., wireless access point which is detected by the UE device as it moves through an area, e.g., a coverage area corresponding to the wireless access point.

In order to achieve Internet connectivity a UE device often has to first establish a radio connection with an access point, successfully complete one or more authentication, authorization and/or accounting operations, successfully interact with a Dynamic Host Configuration Protocol (DHCP) server and then successfully use a Domain Name System (DNS) server before being able to successfully establish contact and/or obtain information from a web server or other device on the Internet. A failure at any of the various steps required to achieve successful Internet access can interfere with a user's experience and ability to communicate or interact with devices on the Internet.

In accordance with various features of the invention, a network monitoring device, e.g., network monitoring node, can, and sometimes does, send configuration information, e.g., instructions in the form of monitoring commands, indicating one or more faults an access point is to monitor for and on which interface or interfaces the monitoring is to be performed.

In at least some such embodiments, the access point buffers packets received on the interface on which it is configured to monitor, e.g., on a per device basis, for one or more faults that may prevent a UE device from successfully accessing the Internet or another network via the access point performing the monitoring. The packets may be, and sometimes are, packets used to communicate messages and/or information as part of a connection establishment processes or one or more of the operations used to establish Internet connectivity.

In response to detecting a fault corresponding to a device the access point sends a fault notification to a network monitoring device along with the buffered packets which were received from or sent to the device prior to detection of the fault. Thus by buffering packets before a fault is reported or detected by a user or the access point, a network node may be made aware of faults which prevent or interfere with a device connecting to the Internet or another network before the user of the device reports a fault and/or otherwise attempts to receive assistance with regard to a problem.

In accordance with the invention, the buffered packets corresponding to a device may be, and often are, deleted upon successful achievement of network connectivity such as successful Internet access which may be, and sometimes is, indicated by a successful DNS lookup operation used to obtain an address used to connect to another device on the Internet. While an access point may be configured to buffer packets to facilitate fault analysis up until Internet access is achieved, the network monitoring node may configure the access point to buffer packets received or sent to a device up until a different point such as completion of an Authentication, Authorization and Accounting (AAA) operation, successful DHCP server access, or successful radio connection establishment.

The monitoring at an access point can be configured on different types of interfaces to monitor for the same or different faults. The faults may be of varying types which interfere with establish of network connectivity but may not, in some cases, interfere with communications, e.g., radio link communications, between the access point and wireless terminal, such as packet errors which can be corrected in many cases through the use of error correcting codes prior to storage of the packet in the packet buffer. The fault monitoring can be customized to take into consideration the type of interface which will be monitored. By allowing the same network device to configure access points of different types and/or different types of interfaces at an access point, a centralized level of fault detection across access points of different types and/or communications technologies can be achieved. Furthermore, since the monitoring can be performed from a remote location it can be performed by an entity other than the owner of the access point. This avoids the need for the access point owner to have an understanding of networking issues and/or the overall network topology which the network monitoring node may take into consideration when attempting to diagnose the reasons for various failures that are reported.

Packets which are buffered prior to successful Internet or network connectivity being achieved are normally deleted for individual devices upon achieving successful network connectivity, e.g., Internet access. However, in some embodiments the network node used for configuring monitoring and to which packets are forwarded in the event of a detected fault may also control monitoring of specific wireless terminals that are able to achieve Internet connectivity but may be providing a customer with problems staying connected and/or which tends to switch between access points excessively.

In some embodiments, the network monitoring node instructs multiple access points to monitor and forward packets corresponding to a specific identified UE device irrespective of detection of a fault condition. As the UE device moves throughout a network or networks the access points capture and forward packets communicated from or to the UE device and also report connectivity information, e.g., when and how long the UE device was connected to the access point reporting the information. By having access points of different types capture and forward packets corresponding to a UE device along with connectivity information, the network monitoring node is provided with connectivity information over a period of time from one or more different types of network connections and/or access points used by a UE device. From this information patterns of problems can be identified facilitating setting or other configuration issues which may result in excessive handoffs which do not preclude establishment of a connection to the Internet but which may degrade service by excessive handoffs or may result in excessive use of one interface, e.g., WiFi, over another interface e.g., LTE in an undesirable manner.

While various embodiments have been discussed in the summary above, it should be appreciated that not necessarily all embodiments include the same features and some of the features described above are not necessary for all embodiments. Numerous additional features, embodiments and benefits of various embodiments are discussed in the detailed description which follows.

BRIEF DESCRIPTION OF THE FIGURES

FIG. 4F is a sixth part of a flowchart of an exemplary method of capturing and providing information related to communications, e.g., wireless communications, in accordance with an exemplary embodiment.

FIG. 4, comprises the combination of FIG. 4A, FIG. 4B, FIG. 4C, FIG. 4D, FIG. 4E and FIG. 4F.

FIG. 6B is a second part of assembly of modules which may be included in an exemplary access point in accordance with an exemplary embodiment.

FIG. 6 comprises the combination of FIG. 6A and FIG. 6B.

FIG. 7 is a drawing of an exemplary communications device, e.g., a UE device, in accordance with an exemplary embodiment.

DETAILED DESCRIPTION

Figure 1:
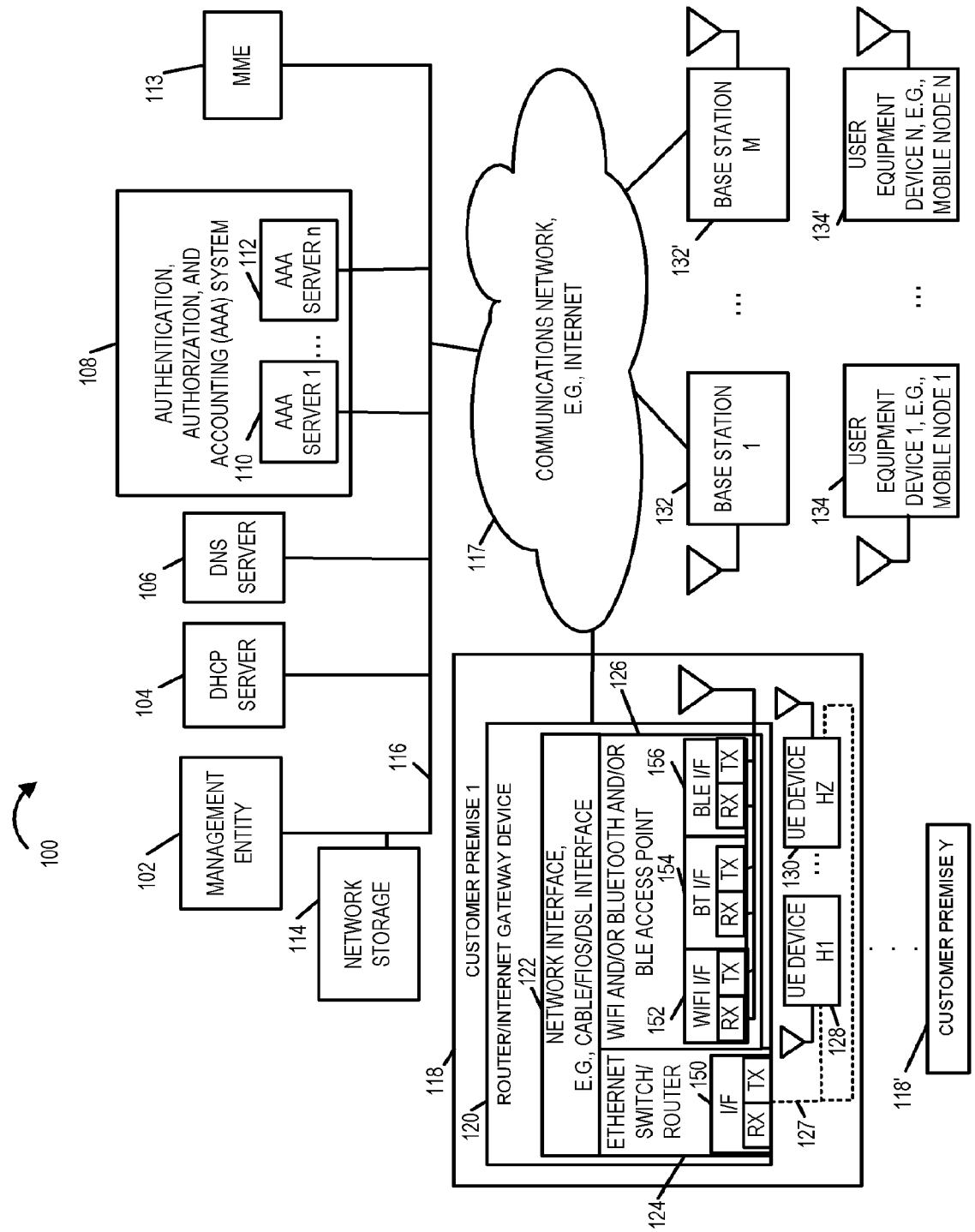
FIG. 1 is a drawing of an exemplary system, in accordance with an exemplary embodiment.

FIG. 1 is a drawing of an exemplary system 100 implemented in accordance with an exemplary embodiment. Exemplary system 100 includes a plurality of devices including a management entity 102, a Dynamic Host Configuration Protocol (DHCP) server 104, a Domain Name System (DNS) sever 106, an Authentication, Authorization and Accounting (AAA) system including multiple AAA servers 110, . . . , 112, a Mobility Management Entity (MME) 113 which may be an LTE MME or another entity for maintaining User Equipment (UE) device information and managing device mobility and a network storage device 114 which are coupled together by network connections 116 and/or directly to the Internet 117 or other networks.

Connected to the communications network 117, e.g., Internet, are customer premises (customer premise 1 118, . . . , customer premise Y 118') and wireless base stations (wireless base station 1 132, . . . , wireless base station M 132'). The customer premises (customer premise 1 118, . . . , customer premise Y 118'), in some embodiments, each include a gateway device 120 that operates as an Internet access point. In the FIG. 1 example the gateway 120 device includes a network interface, e.g., cable, FIOS or DSL interface which provides a wired (where wire could include an optical fiber wire) connection to the Internet 117. Included in the gateway 120 is an Ethernet switch and/or router 124 and a WiFi and/or Bluetooth wireless access point 126 which can communicate via the network interface 122 with the Internet. The Ethernet switch/router 124 operates as a wired access point through which devices, e.g., UE device 128, . . . , UE device HZ 130, can connect via a wired Ethernet, e.g., wired Ethernet 127, to the Internet while wireless access point 126 acts as a wireless access point. While the access points (124, 126) shown as part of gateway device 120, the customer premise 118 may include Ethernet switches/routers 124 or WiFi access points 126 which are connected directly to the Internet 117 by an interface. Thus the example of the access points 124, 126 being part of a gateway 120 is exemplary and not in any way critical to the invention.

UE devices (UE device H1 128, . . . , UE device HN 130), located at customer premise 1, upon successful attachment to one of the access points 124 or 126 or UE devices (UE device 1 134, e.g., mobile node 1, . . . , UE device N 134', e.g., mobile node N) upon successful wireless connection to an access point 132, . . . , 132', can interact with the AAA system 108 to be authorized for Internet service, access the DHCP server 104 to obtain the address of the DNS server 106 and/or other information that can be used to access the Internet, and can use the DNS server 106 to resolve a URL to an IP address allowing for successful communication with a device to which the IP address corresponds. As should be appreciated failure to achieve successful attachment to an access point 124, 126, 132 or 132' or an inability to obtain service or information from the AAA system 108, DHCP server 104 or DNS sever 106 may interfere with successful use of the Internet by a UE device, e.g., UE 128, 130, 134 or 134'.

The devices coupled to network 116 can communicate with other devices via the network or Internet 117. The management entity 102 is a network node that can communicate with base stations 132, 132' and devices at customer premises 118, 118' including gateway device 120 and the access points 124 and 126 included therein via the Internet 117. Thus the management entity 102, which can be viewed as a backend entity since it is not located at the customer premises or base stations, can and in accordance with some embodiments does, send control and configuration information to a wide variety of access points of different types. In some embodiments, the management entity 102 is a network monitoring node. While shown as a single node in FIG. 1, the management entity's functionality can be, and is, implemented in a distributed manner in some embodiments. It should be appreciated that the management entity 102 may be a different entity than one used for normal telephony call set up and may not be in the call set up or signaling path of VoIP calls or other Internet based communications sessions. Thus, the management entity 102, in some embodiments, is not in a position to snoop or directly monitor session setup or control signaling which may be exchanged between communication end points, between the DHCP server 104 and a UE device, between the DNS server 106 and a UE device or the AAA system 108 and a UE or base station. However, the access points to which a UE device attaches are normally in the data and control paths of such communications.

Communication between devices coupled to access points, such as wireless base stations 132, 132' and/or gateway device 120 can occur once successful Internet access has been achieved. Such Internet access may fail for any of a number of reasons which are not directly observable to the management entity 102 responsible for collecting network fault information and packets which might be useful in detecting and/or determining the cause of faults interfering with communication, e.g., over a communications network such as the Internet 117.

Thus, via communications network 117, e.g., the Internet, the management entity 102 can send configuration instructions to the wireless access points, e.g., base stations 132, 132' which may use licensed and/or unlicensed spectrum and can also communicate with wired or wireless access points at various customer premises. In addition the management entity 102, which as discussed below includes a processor, memory and a network interface, can receive fault notification messages reporting detected faults or failures as well as buffered packets associated with the detected failure. The packets may have been collected by an access point prior to detection of the failure, also sometimes referred to as a fault, and provided with the fault notification message to the management entity. The management entity 102 can configure access points of varying types and thus can receive failure messages from a device trying to connect via different networks and/or interfaces. This can be particularly useful in diagnosing network problems with multi-mode devices which can switch between using networks of different types, e.g., LTE, WiFi, Bluetooth, etc.

The management entity can run what may be referred to as backend cloud software that controls one or more of the access points 124, 126, 132, 132' to capture packets prior to, e.g., leading to, a failure, dynamically monitor for connectivity failures and to report detected failures along with the packets leading to the failure of a device to connect to the Internet or access point. The packet capture can be on one, some or all data interfaces of an access point under the direction of the management entity 102 which can instruct an access point to perform packet buffing and communications failure monitoring on one or more interfaces. Access point interfaces which can be configured by the management entity 102 include Ethernet interfaces, e.g. Ethernet Interface 150 included in Ethernet switch router 124, and Radio interfaces, e.g., e.g., WiFi interface 152, e.g., an 802.11 interface, Bluetooth interface 154, and Bluetooth Low Energy (BLE) interface 156, included in wireless access point 126. Each interface (150, 152, 154, 156) includes a receiver and a transmitter. As part of the packet capture process, the access point performing the monitoring and packet capture may create a packet capture file that includes metadata associated with the packet data corresponding to a device for which a failure is detected or for which the access point has been configured to capture and forward packets even in the absence of a detected failure. For example, for 802.11 packets metadata which is also captured and stored includes, in some embodiments, a radiotap header with 802.11 metadata such as signal strength, packet rate, receive status and transmit status.

The management entity 102 can control and configure the access points to capture multiple dimensions of information as part of the packet capture process in the access point.

For example, the management entity can configure one or more access points or specific access points to monitor and collect information and/or set various collection related settings. In some embodiments the management entity 102 can do one, more or all of the following:

i) can specify types of connectivity related failures to be detected and reported—e.g. Association Failures, Authentication/Authorization failures, DHCP Failures, DNS lookup failures;

ii) can indicate a number of broadcast and multicast packets to capture during connectivity and provide in the event of detection of a connectivity failure corresponding to a device;

iii) can indicate a total number of packets and packet length to capture for a device; and iv) can specify whether to enable or disable packet captures along with detecting and reporting of connection failures and associated buffered packets/information.

The management entity 102 is configured in some embodiments to disseminate packet capture configuration, e.g. control, information used to control packet capture operations at one or more access points, and characteristics across devices, e.g., access points, on a Service Set Identifier (SSID) basis, site basis or other basis.

When an access point receive packet capture related configuration information, it configures its interfaces, depending on the configuration information, to perform one or more of the following capture and/or packet upload related operations:

i) monitor new client, e.g., device, connection setup and on renewals, such as DHCP renewal, 801.1x reauthentication, Wi-Fi Protected Access (WPA) Group Temporal Key (GTK) rekey;

ii) actively look for, e.g., monitor to detect, configuration and/or connection failure conditions, e.g., events, messages or packets indicating a failure relating to a connection;

iii) store, e.g., buffer, a copy the client connection packets in internal memory for possible upload in the event of a failure or other upload condition being satisfied; and iv) in response to detecting a failure, e.g., when one of the monitored failure conditions is detected, generate in response to detecting the failure, a corresponding event notification, e.g., with the notification providing information describing or indicating the type of detected failure, a copy of the buffered packets corresponding to the device, e.g., client, to which the failure corresponds, along with a copy of packets stored in memory for device involved in the failure prior to the failure and, optionally, after the failure was detected. The failure notification, packets and related information are sent to the management entity 102 for storage and processing.

The management entity 102, in some but not necessarily all embodiments, responds to a failure notification by taking one, more or all of the following actions for each failure event:

i) stores the failure event in a log which in some but not necessarily all embodiments is implemented in a horizontally scalable NoSQL database in which failure notification information and a link to captured packets is stored;

ii) stores the packets which were provided with a failure notification in a network storage device or cloud database, e.g., in a secure manner such as with the use of encryption and with a pointer to the network memory location being made available in the event log database as part of an event log which is created corresponding to a received failure notification;

iii) provides external customers access through a network interface to the stored packets, logs and associated event details;

iv) analyses failures for access point and/or UE configuration settings which caused the failure;

v) communicates to the access point or UE which was involved in the failure new configuration information to avoid recurrence of the failure and, optionally, control the access point or UE to automatically reconfigure in accordance with the new configuration information provided my the management entity 102, e.g., the network monitoring node; and vi) determines that additional failure conditions/anomalies are likely and configures access point to collect packet logs for the corresponding expected failures and/or client devices, e.g., UEs, which are likely to encounter future failure conditions or anomalies degrading service. A couple of examples of such behavior are if there is an anomaly in the connect time correlated to clients on a given SSID, the management entity 102 may, and sometimes does, respond by dynamically, e.g., automatically in response to a detected failure or condition, turning on packet captures across the UE devices in a given site/org for all new client, e.g., device, connections. Another example is if the management entity 102 detects that a particular client behavior is anomalous, it can direct multiple devices, e.g., multiple access points, to follow and capture packets for the given client, and forward the captured packets to the management entity 102, irrespective of whether a new failure is detected. The enabling of packet buffering and reporting for a device in the absence of a detected failure is dynamic and can be controlled based on machine learning that some faults are likely to be associated with other faults that may be going undetected.

The management entity 102 allows for varying amounts of packet buffering, fault detection and reporting depending on individual customer's needs and/or network requirements.

The management entity has levels of access point configuration control which enables customers who do not want to use packet capture and reporting for all failures by default and only want to turn failure detection and monitoring on dynamically on a per device or limited failure condition checking basis once the network detects or a user reports one or more failure conditions. For example, pre-fault packet capture may be automatically or manually enabled when a device, e.g., one of the AAA servers 110 or 112 or DHCP server 104, in the communications network 100 detects that a particular client device 128, 130, 134, or 134' is failing Authentication or DHCP. In such a case there may be a high probability that if a particular client fails once, it is likely to fail again, and it would be useful to have packet buffering and reporting of a failure automatically enabled for the device in the future.

In some embodiments, upon detection for a failure for a particular client, the management entity 102 automatically enables packet capture during connection setup for the given client device in multiple, e.g., all, the access points 134, 134', 124, 126 in the network regardless of the type of interface the access point supports. In some embodiments the management entity 102 monitors how much packet data it has received for a particular UE device and/or fault notifications and when the management entity 102 has enough failures logged and/or packet capture data to analyze and determine the cause of failure, the management entity communicates to the access points that the access points should stop packet capture for the client device which encountered the fault thereby dynamically stopping the packet capture corresponding to the device which encountered the fault.

In some embodiments when the management entity 102 detects that multiple clients are failing connectivity on a given SSID or access point (AP). If the anomaly is detected for a given SSID, in some embodiments the management entity 102 enables, e.g., configures the access points, to perform packet capture for new, e.g., all new, client devices, e.g., UEs, using the SSID for which a failure or anomaly was detected or, optionally for just the given device on which failure was detected. Upon collection of enough failure samples, the management entity 102 stops the packet capture and reporting relating to the SSID or device to which a detected failure corresponds.

The described methods and apparatus provide a scalable solution for dynamic packet captures in an automatic manner, e.g., without human intervention, and hence enable smart network automation. Furthermore, the cause of the fault and be identified and new access point or UE configuration information automatically disseminated to correct the configuration problem causing the fault and to avoid the recurrence of such faults in the future.

Figure 2:
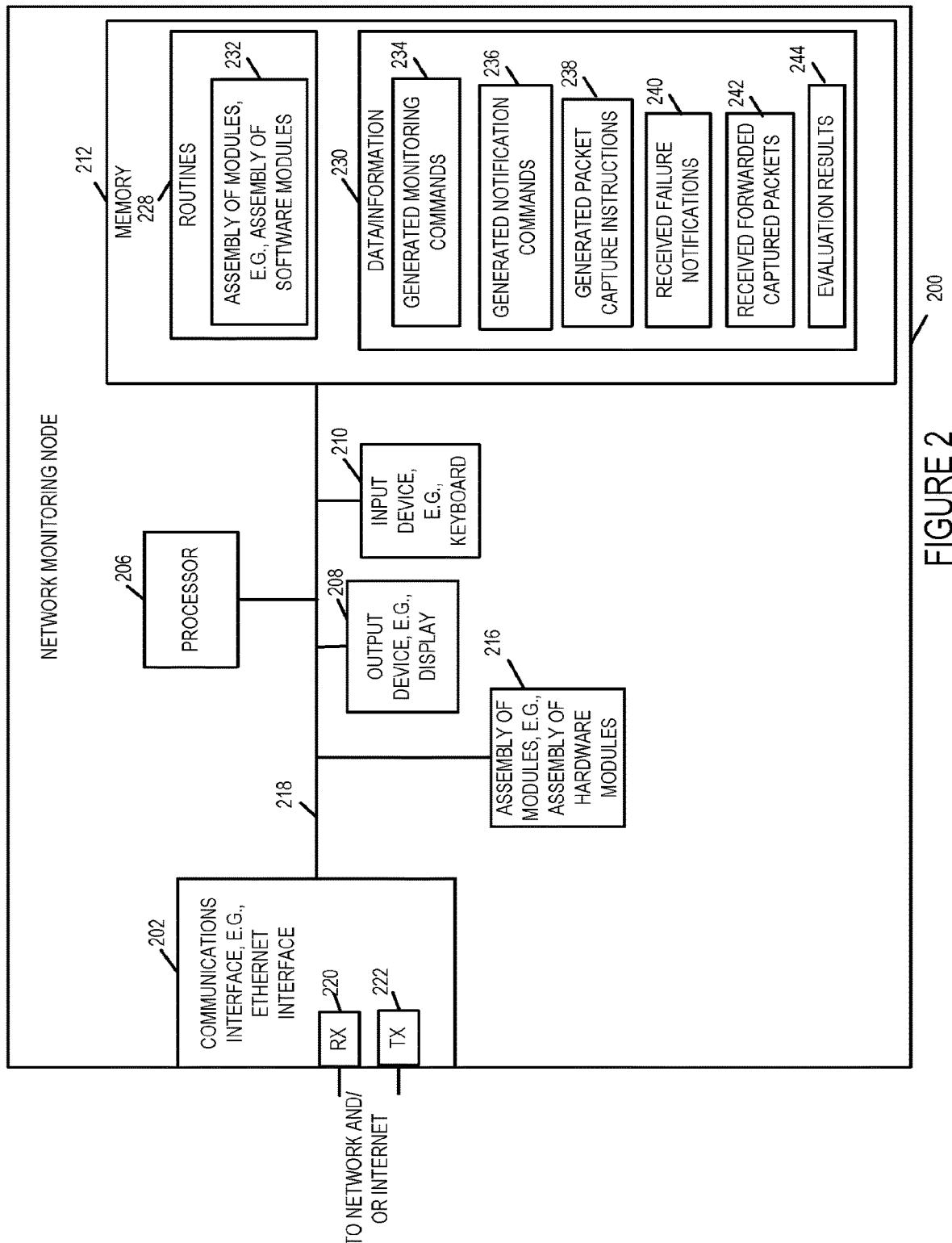
FIG. 2 illustrates an exemplary network monitoring node in accordance with an exemplary embodiment.

FIG. 2 is a drawing of an exemplary network monitoring node 200 in accordance with an exemplary embodiment. In some embodiments, network node 200 of FIG. 2 is management entity 102 of system 100 of FIG. 1. Network management node 200 includes a communications interface 202, e.g., an Ethernet interface 202, a processor 206, an output device 208, e.g., display, printer, etc., an input device 210, e.g., keyboard, keypad, touch screen, mouse, etc., a memory 212 and an assembly of modules 216, e.g., assembly of hardware module, e.g., assembly of circuits, coupled together via a bus 218 over which the various elements may interchange data and information. Communications interface 202 couples the network monitoring node 200 to a network and/or the Internet. Communications interface 202 includes a receiver 220 via which the network monitoring device can receive data and information, e.g., including failure notifications and forwarded captured packets from access points, and a transmitter 222, via which the network monitoring device 200 can send data and information, e.g., including configuration information, monitoring commands, notification commands and packet capture instructions to access points.

Memory 212 includes routines 228 and data/information 230. Routines 228 includes assembly of modules 232, e.g., an assembly of software modules. Data/information 230 includes generated monitoring commands 234, generated notification commands 235, generated packet capture instructions 238, received failure notifications 240, received forwarded captured packets 242, and evaluation results 244.

Figure 3:
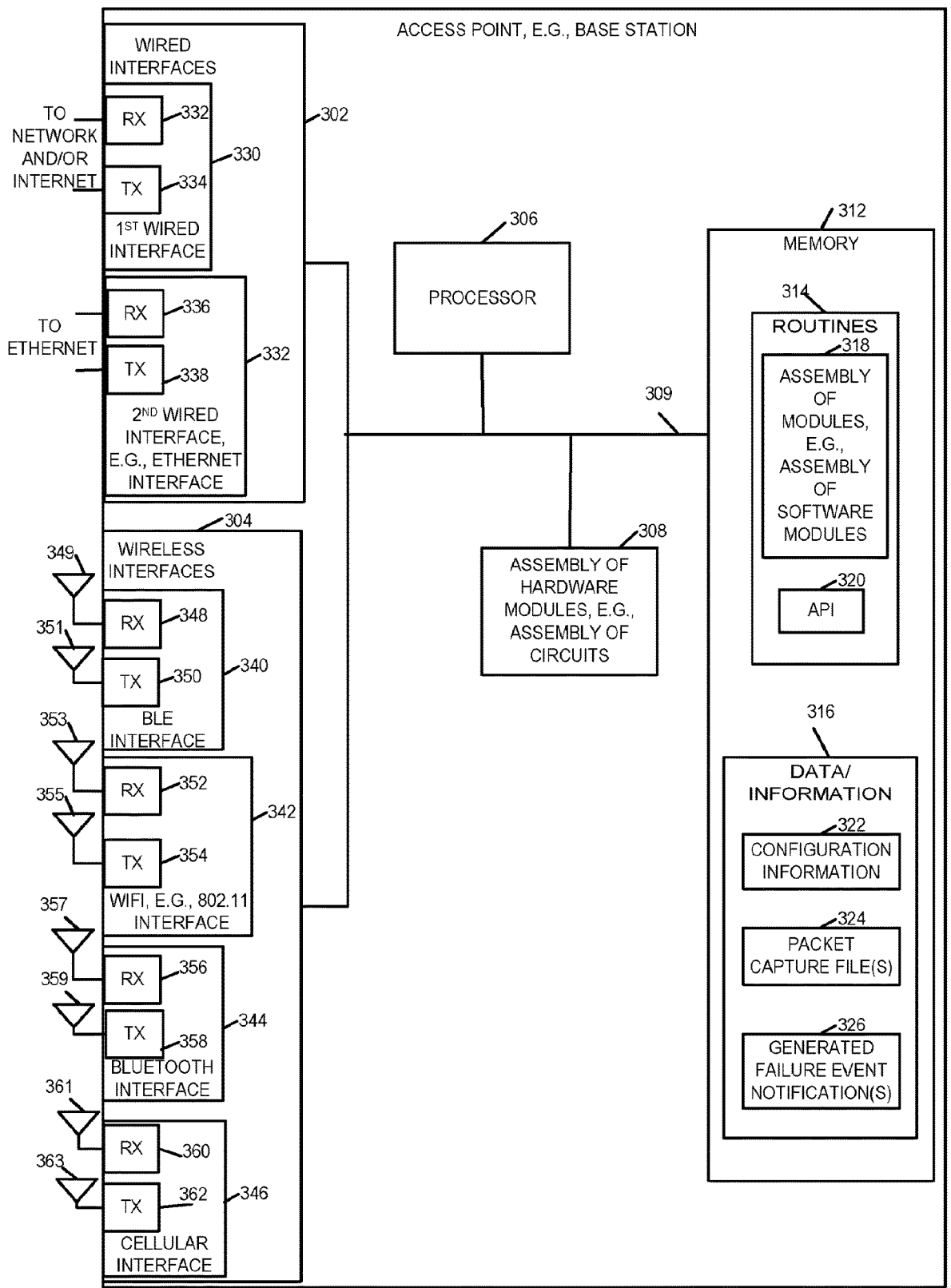
FIG. 3 illustrates an exemplary access point, e.g., base station, in accordance with an exemplary embodiment.
Figure 4A:
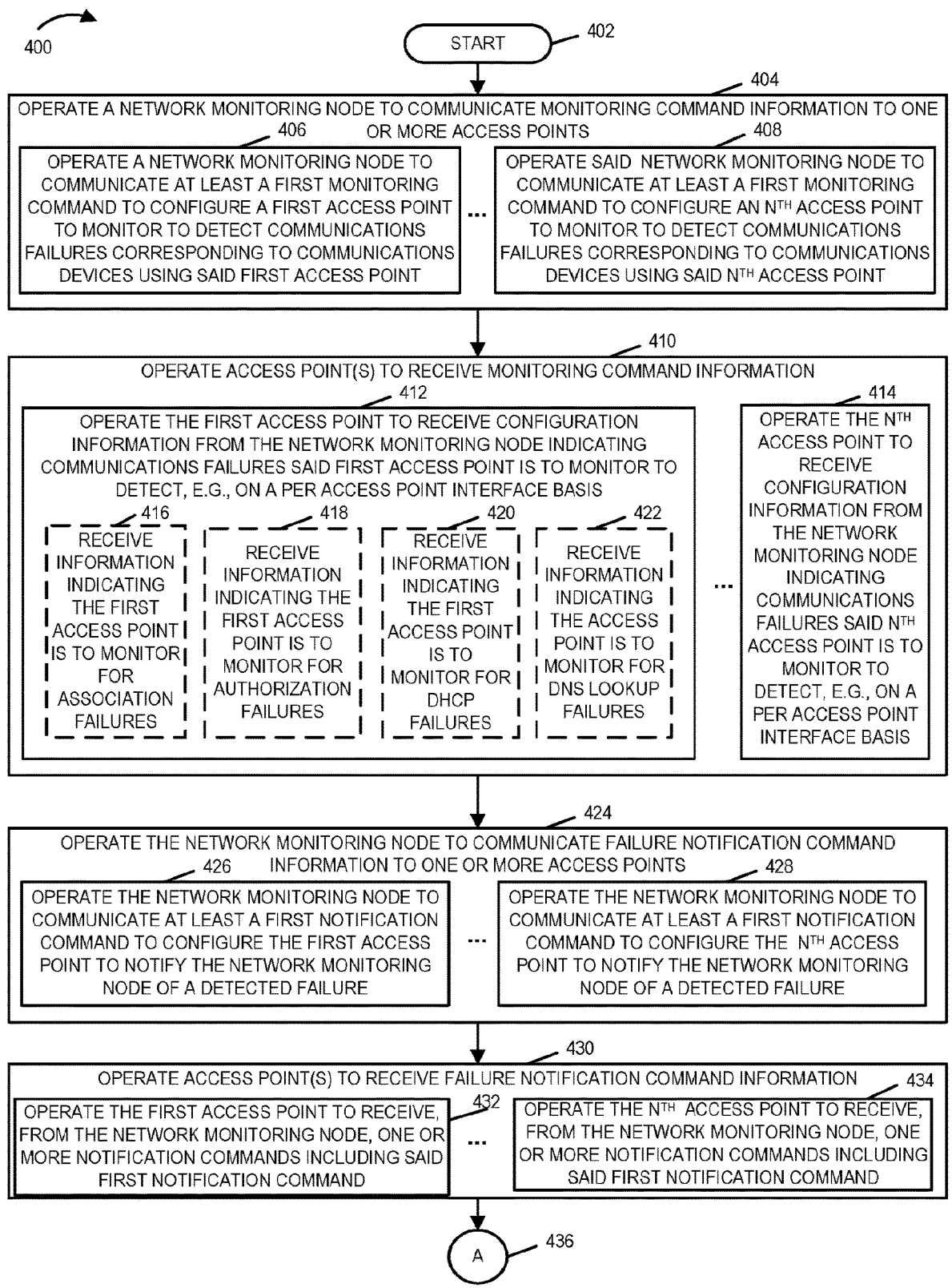
FIG. 4A is a first part of a flowchart of an exemplary method of capturing and providing information related to communications, e.g., wireless communications, in accordance with an exemplary embodiment.
Figure 4B:
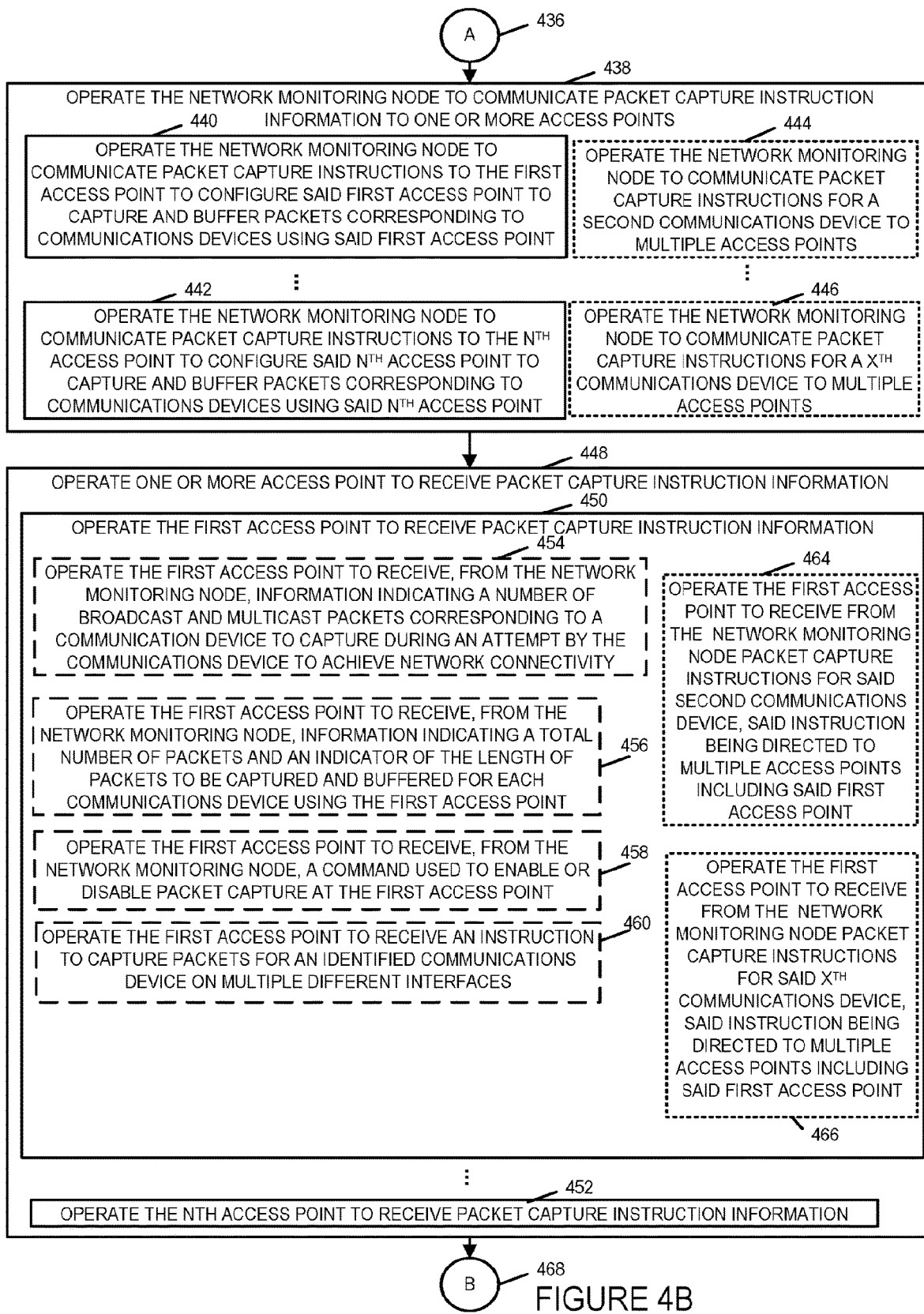
FIG. 4B is a second part of a flowchart of an exemplary method of capturing and providing information related to communications, e.g., wireless communications, in accordance with an exemplary embodiment.
Figure 4C:
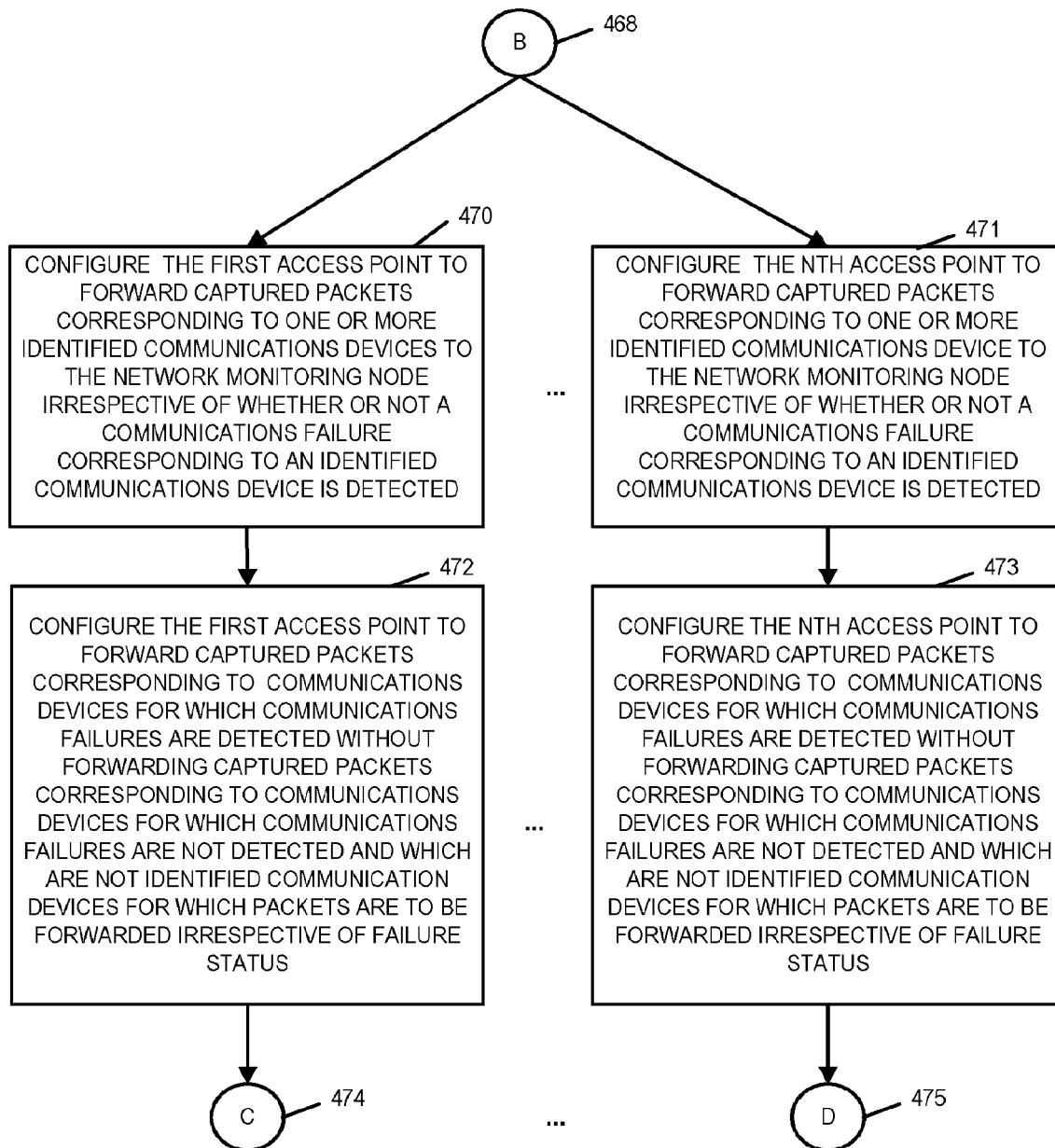
FIG. 4C is a third part of a flowchart of an exemplary method of capturing and providing information related to communications, e.g., wireless communications, in accordance with an exemplary embodiment.
Figure 4D:
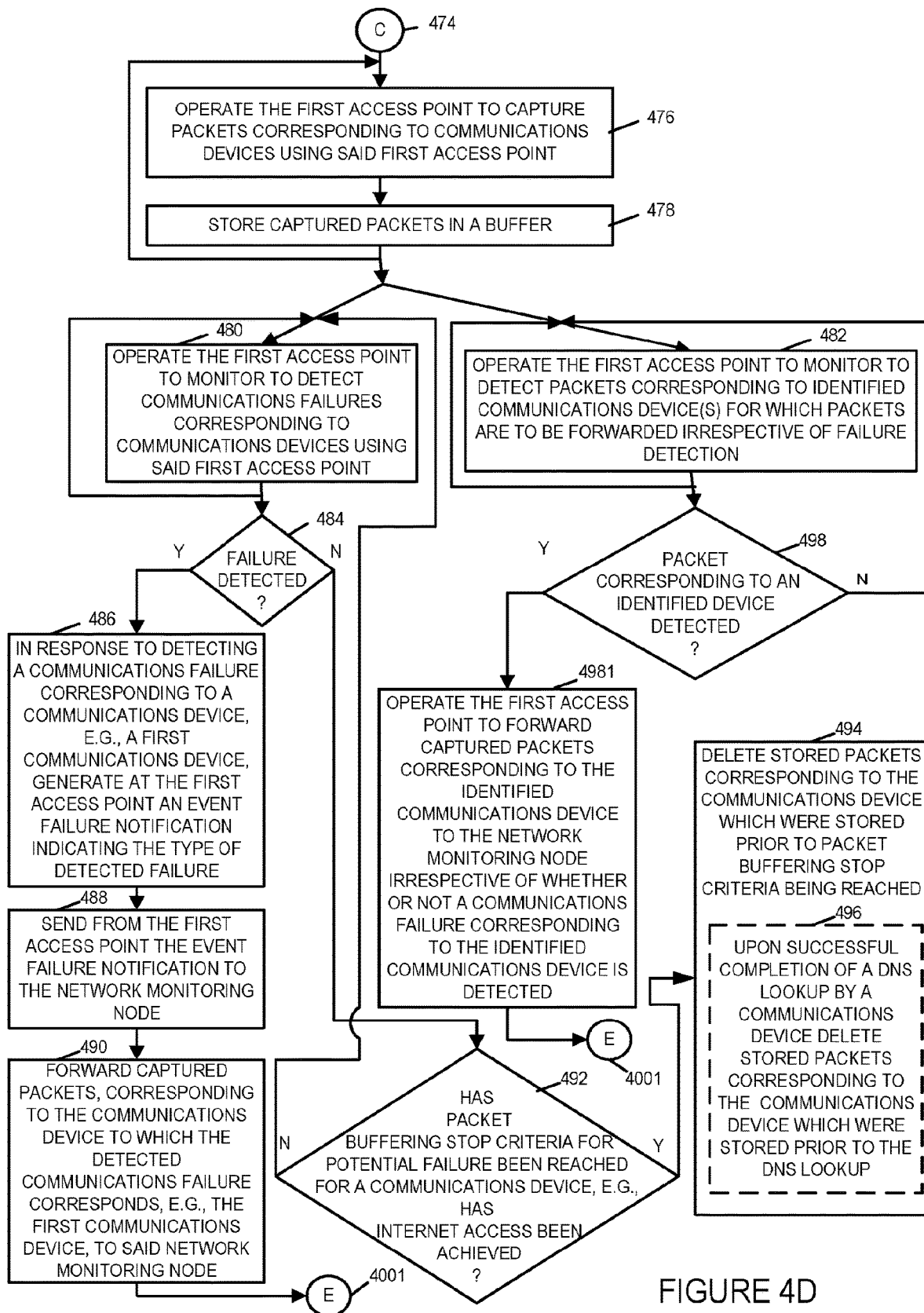
FIG. 4D is a fourth part of a flowchart of an exemplary method of capturing and providing information related to communications, e.g., wireless communications, in accordance with an exemplary embodiment.
Figure 4E:
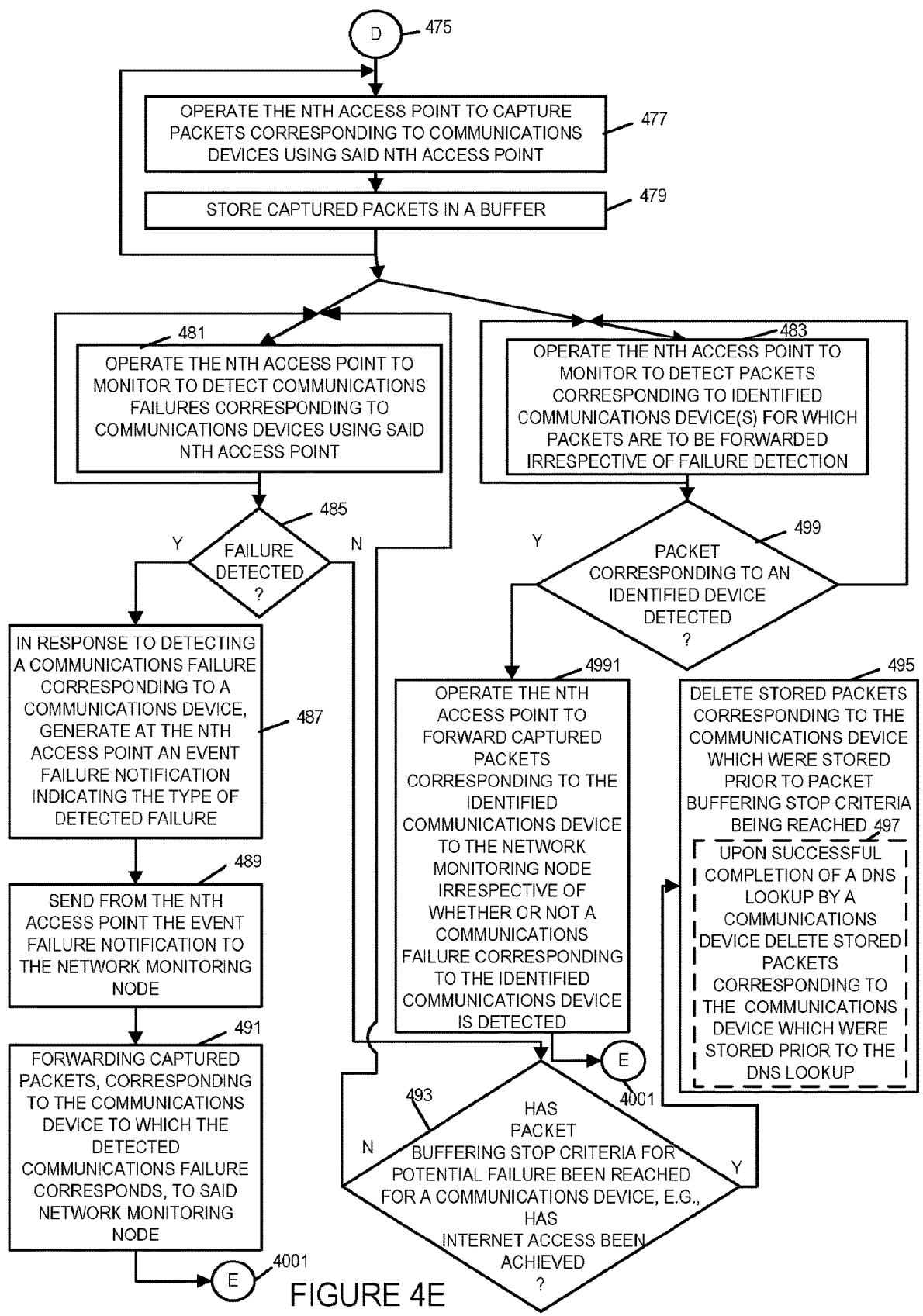
FIG. 4E is a fifth part of a flowchart of an exemplary method of capturing and providing information related to communications, e.g., wireless communications, in accordance with an exemplary embodiment.

FIG. 3 is a drawing of an exemplary access point 300, e.g., base station, in accordance with an exemplary embodiment. In some embodiments, base stations (base station 1 132, . . . , 132') of FIG. 1 are the same as access point 300 of FIG. 3. In some embodiments, gateway device 120 of FIG. 1 is the same as access point 120 of FIG. 1.

Access point 300 includes wired interfaces 302, wireless interfaces 304, a processor 306, e.g., a CPU, a memory 312, and an assembly of modules 308, e.g., assembly of hardware module, e.g., assembly of circuits, coupled together via a bus 309 over which the various elements may interchange data and information. Wired interfaces 302 includes a 1st wired interface 330 including receiver 332 and transmitter 334 and a second wired interface 332 including receiver 336 and transmitter 338. 1st wired interface couples the access point 300 to a network and/or the Internet. 2nd wired interface 332, e.g., an Ethernet interface, couples the access point 300 to an Ethernet network. In one embodiment 1st wired interface 330 is network interface 122 of device 120 of FIG. 1, and 2nd wired interface 332 is Ethernet interface 150 of device 120 of FIG. 1 Wireless interfaces 304 includes a BLE interface 340, a WiFi interface 342, e.g. 802.11 interface, a Bluetooth interface 344, and a cellular interface 346. BLE interface 340 includes receiver 348 coupled to receive antenna 349, via which the access point may receive wireless signals from communications devices, e.g., wireless terminals, and transmitter 350 coupled to transmit antenna 351 via which the access point may transmit wireless signals to communications devices, e.g., wireless terminals. WiFi interface 342 includes receiver 352 coupled to receive antenna 353, via which the access point may receive wireless signals from communications devices, e.g., wireless terminals, and transmitter 354 coupled to transmit antenna 355 via which the access point may transmit wireless signals to communications devices, e.g., wireless terminals. Bluetooth interface 344 includes receiver 356 coupled to receive antenna 357, via which the access point may receive wireless signals from communications devices, e.g., wireless terminals, and transmitter 358 coupled to transmit antenna 359 via which the access point may transmit wireless signals to communications devices, e.g., wireless terminals. Cellular interface 346 includes receiver 360 coupled to receive antenna 361, via which the access point may receive wireless signals from communications devices, e.g., wireless terminals, and transmitter 362 coupled to transmit antenna 363 via which the access point may transmit wireless signals to communications devices, e.g., wireless terminals. In some embodiments, the same antenna is used for one or more different wireless interfaces. In one embodiment, (BLE interface 340, WiFi interface 342, Bluetooth interface 344) of access point 300 are the same as (BLE interface 156, WiFi interface 152, Bluetooth interface 154), respectively, of gateway device 120 of FIG. 1.

Memory 312 includes routines 314 and data/information 316. Routines 314 includes assembly of modules 318, e.g., an assembly of software modules, and Application Programming Interface (API) 320. Data/information 316 includes configuration information 322, packet capture files 324 and generated failure event notifications 326.

FIG. 4, comprising the combination of FIG. 4A, FIG. 4B, FIG. 4C, FIG. 4D, FIG. 4E and FIG. 4F, is a flowchart 400 of an exemplary method of capturing and providing information relating to communications, e.g., wireless communications, in accordance with an exemplary embodiment. Operation of the exemplary starts in step 402 and proceeds to step 404. In step 404 a network monitoring mode is operated to communicate monitoring command information to one or more access points. For example, in one exemplary embodiment, the method of step 404 of FIG. 4 is performed by management entity 102 of system 100 of FIG. 1, which is a network monitoring node implemented in accordance with network monitoring node 200 of FIG. 2. In some embodiments, the access points are wireless access points. For example, the access points are access points 124, 126, 132, 132' of system 100 of FIG. 1 implemented in accordance with access point 300 of FIG. 3. Step 404 includes steps 406 and 408.

In step 406 the network monitoring node is operated to communicate at least a first monitoring command to configure a first access point to monitor to detect communications failures corresponding to communications devices using the first access point. In some embodiments, the first access point is a wireless access point, and the communications devices are wireless devices. For example, the first access point is one of access point 126, access point 132, and access point 132', and the communications devices include one or more or all of UE H1 128, ..., UE HA 130, UE 1 134, ..., UE N 134' of system 100 of FIG. 1. In some embodiments, the first monitoring command is a command instructing the first access point to monitor to detect a specified communications failure corresponding to any communications device using the first access point. In some embodiments, the first monitoring command is a command instructing the first access point to monitor to detect a specified communications failure corresponding to a specific communications device which may use the first access point. In some embodiments, the first monitoring command is a command instructing the first access point to monitor for packets corresponding to a specific portion of a communications operation, e.g., post Internet connection, and a specific communications device. This approach allows for packet capture and reporting for specific communications devices, e.g., wireless terminals, and specific portions of a communications session even when errors have not been detected to facilitate detection of problems which when considered at the time were by themselves not clearly indicative of a problem or error but which when viewed over time may be indicative of an error with a particular portion of a communications session, e.g., a device may repeatedly drop connections on an interface and connect to another interface shortly after successful connection establishment because of errors or problems with the interface/communications like associated with the interface such as a time out setting being shorter than appropriate.

In step 408 the network monitoring node is operated to communicate at least a first monitoring command to configure an Nth access point to monitor to detect communications failures corresponding to communications devices using the Nth access point. Operation proceeds from step 404 to step 410.

In step 410 access points are operated to receive monitoring command information. Step 410 includes step 412 and step 414. In step 412 the first access point is operated to receive configuration information from the network monitoring node, said configuration information indicating communications failures said first access point is to monitor to detect, e.g., on a per access point interface basis. In some embodiments, the first access point includes multiple different interfaces and the information from the network monitoring mode indicating communications failures that said first access point is to monitor for is provided on a per access point interface basis. In some such embodiments, the multiple different interfaces include two different wireless interfaces. Exemplary different wireless interfaces include a cellular wireless interface, a WiFi wireless interface, e.g., an 802.11 interface, a Bluetooth wireless interface, and a BLE wireless interface. In some embodiments, the information indicating communications failures said first access point is to monitor include one or more of: association failures, authentication failures, authorization failures, and DNS lookup failures. Step 412 includes one or more or all of steps 416, 418, 420 and 422. In step 416 the first access point receives information indicating that the first access point is to monitor for association failures. In step 418 the first access point receives information indicating that the first access point is to monitor for authorization failures. In step 420 the first access point receives information indicating that the first access point is to monitor for dynamic host configuration protocol (DHCP) failures. In step 422 the first access point receives information indicating that the first access point is to monitor for domain name system (DNS) lookup failures. In step 414 the Nth access point is operated to receive configuration information from the network monitoring node, said configuration information indicating communications failures said Nth point is to monitor to detect, e.g., on a per access point interface basis. Operation proceeds from step 410 to step 424.

In step 424 the network monitoring node is operated to communicate failure notification command information to one or more access points. Step 424 includes steps 426 and 428. In step 426 the network monitoring node is operated to communicate at least a first notification command to configure the first access point to notify the network monitoring node of a detected failure. In step 428 the network monitoring node is operated to communicate at least a first notification command to configure the Nth access point to notify the network monitoring node of a detected failure. Operation proceeds from step 424 to step 430.

In step 430, the access point(s) are operated to receive failure notification command information. Step 430 includes steps 432 and 434. In step 432 the first access node is operated to receive from the network monitoring node one or more notification commands including said first notification command, e.g., the notification command(s) sent in step 426. In step 432 the Nth node is operated to receive from the network monitoring node one or more notification commands including said first notification command, e.g., the notification command(s) sent in step 428. Operation proceeds from step 430, via connecting node A 436 to step 438.

In step 438 the network monitoring node is operated to communicate pack capture instruction information to one or more access points. Step 438 includes steps 440, 442, 444 and 446. In step 440 the network monitoring node is operated to communicate packet capture instruction to the first access point to configure said first access point to capture and buffer packets corresponding to communications devices using said first access point. In step 442 the network monitoring node is operated to communicate packet capture instruction to the Nth access point to configure said Nth access point to capture and buffer packets corresponding to communications devices using said Nth access point. In step 444 the network monitoring node is operated to communicate packet capture instruction for a second communications device to multiple access points. In some embodiments, said packet capture instructions include instructions to capture packets corresponding to the second communications device on any interface on which said second communications device communicates with an access point. In some such embodiments, said packet capture instructions include instructions to forward captured packets corresponding to the second communications device even in the absence of detection of a communications failure corresponding to the second communications device. In some embodiments, said packet capture instructions include instructions to capture and forward packets corresponding to an indicated portion of a communications activity by the second communications device. In some embodiments, said packet capture instructions include instructions to forward captured packets corresponding to the second communications device which are captured after the second communications device has achieved successful Internet connectivity. In some such embodiments, said packet capture instructions include instructions to forward captured packets corresponding to the second communications device which are captured after the second communications device has achieved successful Internet connectivity but not before that point. In some embodiments, the packet capture instructions include instructions to capture packets corresponding to the second communications device on a specified set of interfaces on which said second communications device may communicates with an access point, said specified set being less than the full set of interfaces which may be used by the second communications device to communicate with an access point. In some embodiments, the packet capture instructions include an instruction identifying a set of interfaces, e.g., a set of interfaces which is a subset of the full set of available interfaces that may be used by the second communications device, and identifying one or more selected portions of communication activity for which packets are to be captured and forwarded to the network monitoring mode irrespective of failure status. In some such embodiments, said one or more selected portions of communications activity are less than a full set of possible portions of communications activity.

In step 446 the network monitoring node is operated to communicate packet capture instruction for an Xth communications device to multiple access points. Operation proceeds from step 438 to step 448.

In step 448 one or more access points are operated to receive packet capture instruction information. Step 448 includes steps 450 and 452. In step 450 the first access point is operated to receive packet capture instruction information. In step 452 the Nth access point is operated to receive packet capture instruction information. Step 450 includes one or more or all of steps 454, 456, 458, 460, 464 and 466.

In step 454 the first access point is operated to receive, from the network monitoring node, information indicating a number of broadcast and multicast packets corresponding to a communications device to capture during an attempt by the communications device to achieve network connectivity. In step 456 the first access point is operated to receive from the network monitoring node information indicating a total number of packets and an indicator of the length of packets to be captured and buffered for each communications device using the first access point. In step 458 the first access point is operated to receive, from the network monitoring node, a command used to enable of disable packet capture at the first access point. In step 460 the first access point is operated to receive an instruction to capture packets for an identified communications device on multiple different interfaces. In step 464 the first access point is operated to receive, from the network monitoring node, a packet capture instruction for said second communications device, said instruction being directed to multiple access points including the first access point. In step 466 the first access point is operate to receive, from the network monitoring node, packet capture instruction for said Xth communications device, said instruction being directed to multiple access points including the first access point.

Operation proceeds from step 448, via connecting node B 468, to steps 470 and 471.

In step 470 the first access point is configured to forward captured packets, corresponding to one or more identified communication devices, to the network monitoring node irrespective of whether or not a communications failure corresponding to an identified communications device is detected. For example, in step 470 the first access point configures itself to forward captured packets corresponding to identified devices, which are identified in the instruction received in step 460, irrespective of whether or not a communications failure corresponding to the identified device was detected. Operation proceeds from step 470 to step 472.

In step 472 the first access point is configured to forward captured packets, corresponding to communications devices for which communications failures are detected, without forwarding captured packets, corresponding to communications devices for which communications failures are not detected and which are not identified communications devices for which packets are to be forwarded irrespective of failure status. Operation proceeds from step 472, via connecting node C 474 to step 476.

In step 476 the first access point is operated to capture packets corresponding to communications devices using said first access point. Operation proceeds from step 476 to step 478. In step 478 the first access point stores the captured packets in a buffer, e.g., a buffer in memory in the first access point. Operation proceeds from step 478 to the input of step 476, and to steps 480 and 482.

In step 480 the first access point is operated to monitor to detect communications failures corresponding to said communications devices using said first access point. Operation proceeds from step 480 to step 484. In step 484 the first access point determines if a communications failure has been detected and controls operation as a function of the determination. If a failure has been detected, then operation proceeds from step 484 to step 486. In step 486, in response to detecting a communications failure corresponding to a communications device using said first access point, e.g., a first communication device, the first access point generates at the first access point an event failure notification indicating the type of detected failure. Operation proceeds from step 486 to step 488. In step 488 the first access point sends from the first access point to the network monitoring node the generated event failure notification. Operation proceeds from step 488 to step 490. In step 490 the first access point forwards captured packets, corresponding to the communications device to which the detected failure corresponds, e.g., the first communications device, to said network monitoring node. Operation proceeds from step 490, via connecting node E 4001 to step 4003.

Returning to step 484, if a failure has not been detected, then operation proceeds from step 484 to step 492. In step 492 the first access point checks and determines if a packet buffering stop criteria for potential failure has been reached for a communications device, e.g., has Internet access been achieved for the communications device. If the determination of step 492 is that the packet buffering stop criteria has been reached, then operation proceeds from step 492 to step 494. In step 494 the first access point deletes stored packets corresponding to the communications device which were stored prior to the packet buffering stop criteria being reached. In some embodiments, step 494 includes step 496 in which the first access point, upon successful completion of a DNS lookup by a communications device, deletes stored packets corresponding to the communications device which were stored prior to the DNS lookup.

Returning to step 482, in step 482 the first access point is operated to monitor to detect packets corresponding to identified communications device(s) for which packets are to be forwarded irrespective of failure detection. Operation proceeds from step 482 to step 498. In step 498, if a packet corresponding to an identified device for which the first access point is to forward packets irrespective of failure criteria, is detected, then operation proceeds from step 498 to step 4981 in which the first access point is operated to forward captured packets corresponding to the identified communications device to the network monitoring node irrespective of whether or not a communication failure corresponding to the identified communications device is detected. Operation proceeds from step 4981, via connecting node E 4001 to step 4003.

In some embodiments, the identified communications device, e.g., a wireless terminal, is a multi-mode communications device, and a communications failure on a first interface, e.g., a first wireless interface, causes the identified communications device, to switch to a second interface, e.g., a second wireless interface. In some such embodiments, the first and second interfaces are different type of wireless interfaces. In some such embodiments, the first interface is one of: a WiFi interface, a Bluetooth interface, a BLE interface and a cellular interface, and the second interface is a different one of: a WiFi interface, a Bluetooth interface, a BLE interface and a cellular interface.

Returning to step 471, in step 471 the Nth access point is configured to forward captured packets, corresponding to one or more identified communication devices, to the network monitoring node irrespective of whether or not a communications failure corresponding to an identified communications device is detected. Operation proceeds from step 471 to step 473.

In step 473 the Nth access point is configured to forward captured packets, corresponding to communications devices for which communications failures are detected, without forwarding captured packets, corresponding to communications devices for which communications failures are not detected and which are not identified communications devices for which packets are to be forwarded irrespective of failure status. Operation proceeds from step 473, via connecting node D 475 to step 477.

In step 477 the Nth access point is operated to capture packets corresponding to communications devices using said Nth access point. Operation proceeds from step 477 to step 479. In step 479 the Nth access point stores the captured packets in a buffer, e.g., a buffer in memory in the Nth access point. Operation proceeds from step 479 to the input of step 477, and to steps 481 and 483.

In step 481 the Nth access point is operated to monitor to detect communications failures corresponding to said communications devices using said Nth access point. Operation proceeds from step 481 to step 485. In step 485 the Nth access point determines if a communications failure has been detected and controls operation as a function of the determination. If a failure has been detected, then operation proceeds from step 485 to step 487. In step 487, in response to detecting a communication failure corresponding to a communications device using said Nth access point, the Nth access point generates at the Nth access point an event failure notification indicating the type of detected failure. Operation proceeds from step 487 to step 489. In step 489 the Nth access point sends from the Nth access point to the network monitoring node the generated event failure notification. Operation proceeds from step 489 to step 491. In step 491 the Nth access point forwards captured packets, corresponding to the communications device to which the detected failure corresponds to said network monitoring node. Operation proceeds from step 491, via connecting node E 4001 to step 4003.

Returning to step 485, if a failure has not been detected, then operation proceeds from step 485 to step 493. In step 493 the Nth access point checks and determines if a packet buffering stop criteria for potential failure has been reached for a communications device, e.g., has Internet access been achieved for the communications device. If the determination of step 493 is that the packet buffering stop criteria has been reached, then operation proceeds from step 493 to step 495. In step 495 the Nth access point deletes stored packets corresponding to the communications device which were stored prior to the packet buffering stop criteria being reached. In some embodiments, step 495 includes step 497 in which the Nth access point, upon successful completion of a DNS lookup by a communications device, deletes stored packets corresponding to the communications device which were stored prior to the DNS lookup.

Returning to step 483, in step 483 the Nth access point is operated to monitor to detect packets corresponding to identified communications device(s) for which packets are to be forwarded irrespective of failure detection. Operation proceeds from step 483 to step 499. In step 499, if a packet corresponding to an identified device for which the Nth access point is to forward packets irrespective of failure criteria, is detected, then operation proceeds from step 499 to step 4991 in which the Nth access point is operated to forward the captured packets corresponding to the identified communications device to the network monitoring node irrespective of whether or not a communication failure corresponding to the identified device has been detected. Operation proceeds from step 4991, via connecting node E 4001 to step 4003.

In step 4003 the network monitoring node is operated to receive failure notifications, captured packets corresponding to the detected failures and/or captured packets corresponding to identified communications devices. Operation proceeds from step 4003 to step 4005.

In step 4005 the network monitoring node is operated to analyze the received failure notifications, captured packets corresponding to detected failures and/or captured packets corresponding to identified communications devices. Step 4005 includes one or more of all of steps 4007, 4009, 4011, 4013, 4015, and 4017. In step 4007 the network monitoring node detects, e.g., dynamically detects, that a DHCP server is misconfigured. In step 4009 the network monitoring node detects, e.g. dynamically detects, that a large number, e.g., a number over a predetermined threshold, of authentication failures are driven by timeouts during hand shakes, e.g., as a result of poor cover, failure, and/or retries, e.g., via analysis of dynamically captured packets. In step 4011 the network monitoring node detects, e.g., dynamically detects, that authentication failures or DHCP failures are related to WLAN/SSID configuration, e.g., a bad VLAN or a bad server IP. In step 4013 the network monitoring node detects, e.g., dynamically detects, that failures are correlated to a single device while other devices are working properly. In step 4015 the network monitoring node detects, e.g., dynamically detects, that failures are correlated to a single WLAN while other WLANs are working properly. In step 4017 the network monitoring node detects anomalies based on analysis of stored packet capture over a long time period, e.g., hours or days. Operation proceeds from step 4005 to step 4019. In step 4019 the network monitoring node is operated to take corrective action in response to the analysis of step 4005. Step 4019 includes one or more or all of steps 4021, 4023, 4025, 4027, 4029 and 4031. In step 4021 the network monitoring node sends a command and/or notifications to reconfigure the DHCP server, in response to the detection in step 4007 of a misconfigured DHCP server. In step 4021 the network monitoring node sends control message(s) to improve air link channel quality in response to the detection in step 4009 that a large number of authentication failures are driven by timeouts during handshakes. For example, the network monitoring node uses radio management software to modify or control modification of TX power and/or channel to improve air link quality. In step 4023 the network monitoring node sends an anomaly detection notification, e.g., including information identifying the suspect bad VLAN IP or suspect bad server IP, to the network administrator in response to detection in step 4011 that authentication failures or DHCP failures are related to WLAN and/or S SID configuration. In step 4027 the network monitoring node sends a command to reboot the detected device to which failures are correlated, in response to detect in step 4013 that failures are correlated to a single device. In step 4029 the network monitoring node sends a command to reboot an access point, corresponding to the WAN, to which failures are correlated, in response to the detection in step 4015 that failures are correlated to a single WLAN. In some embodiments in step 4029 the network monitoring node sends a command to reboot multiple access point, e.g., the set of multiple access points corresponding to the WAN, to which failures are correlated, in response to the detection in step 4015 that failures are correlated to a single WLAN. In step 4031 the network monitoring node sends a notification to the network administrator of the detected anomaly based on the long term packet capture analysis, in response to a detected anomaly in step 4017.

Figure 5A:
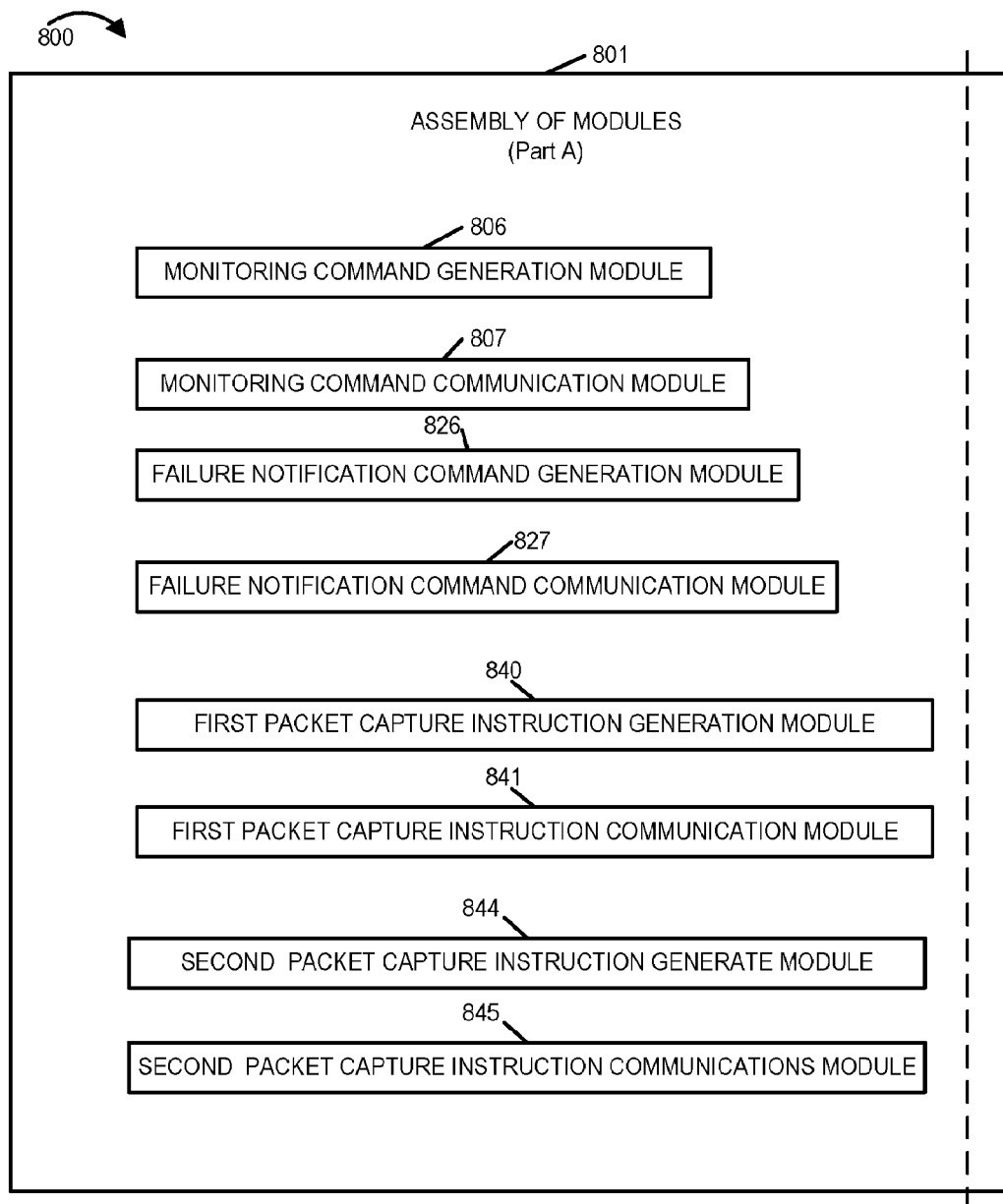
FIG. 5A is a first part of an assembly of modules which may be included in an exemplary network monitoring node in accordance with an exemplary embodiment.
Figures 5, 5B:
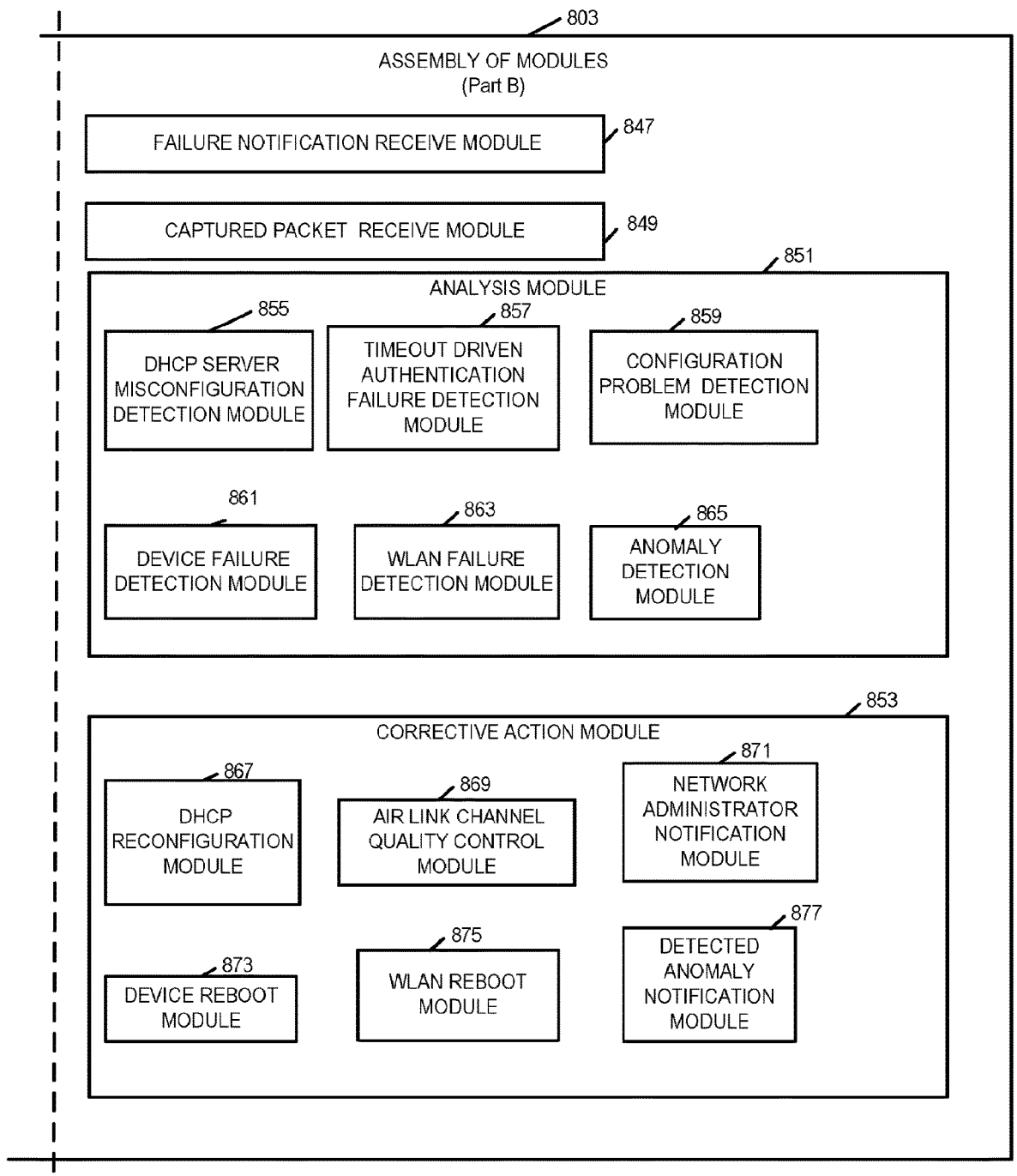
FIG. 5B is a second part of an assembly of modules which may be included in an exemplary network monitoring node in accordance with an exemplary embodiment.
FIG. 5 comprises the combination of FIG. 5A and FIG. 5B.

FIG. 5, comprising the combination of FIG. 5A and FIG. 5B, is a drawing of an exemplary assembly of modules 800, comprising Part A 801 and Part B 803, in accordance with an exemplary embodiment. In some embodiments, assembly of modules 800 is included in a network monitoring node, e.g., network monitoring node 200 of FIG. 2 or management entity 102 of FIG. 1, implemented in accordance with an exemplary embodiment.

The modules in the assembly of modules 800 can, and in some embodiments are, implemented fully in hardware within a processor, e.g., processor 208, e.g., as individual circuits. The modules in the assembly of modules 800 can, and in some embodiments are, implemented fully in hardware within an assembly of modules external to the processor, e.g., as individual circuits corresponding to the different modules, e.g., assembly of modules 216. In other embodiments some of the modules are implemented, e.g., as circuits, within the processor with other modules being implemented, e.g., as circuits within and assembly of modules, external to and coupled to the processor. As should be appreciated the level of integration of modules in the processor and/or with some modules being external to the processor may be one of design choice.

Alternatively, rather than being implemented as circuits, all or some of the modules may be implemented in software and stored in the memory of a device, with the modules controlling operation of device to implement the functions corresponding to the modules when the modules are executed by a processor. In some such embodiments, the assembly of modules 800 is included in a memory, e.g., assembly of modules 232 in memory 212. In some such embodiments, the assembly of modules is included as part of the routines in memory. In still other embodiments, various modules in assembly of modules 800 are implemented as a combination of hardware and software, e.g., with another circuit external to the processor providing input to a processor which then under software control operates to perform a portion of a module's function. While shown in various embodiments as a single processor, e.g., computer, it should be appreciated that the processor may be implemented as one or more processors, e.g., computers.

When implemented in software the modules include code, which when executed by the processor, configure the processor to implement the function corresponding to the module. In embodiments where the assembly of modules 800 is stored in memory, the memory is a computer program product comprising a computer readable medium comprising code, e.g., individual code for each module, for causing at least one computer, e.g., a processor, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 5 control and/or configure the device or elements therein such as a processor, to perform the functions of corresponding steps illustrated in a method, e.g., steps of the method of flowchart 400 of FIG. 4.

Assembly of modules 800 includes a monitoring command generation module 806, a monitoring command communication module 807, a failure notification command generation module 826, a failure notification command communication module 827, a first packet capture instruction generation module 840, a first packet capture instruction communication module 841, a second packet capture instruction generation module 844, a second packet capture instruction communication module 845, a failure notification message receive module 847, a captured packet receive module 849, an analysis module 851, and a corrective action module 853.

Monitoring command generation module 806 is configured to generate monitoring commands to configured access points to monitor to detect communications failures corresponding to communications devices using the access points. Monitoring command generation module 806 is configured to generate at least a first monitoring command to configure a first access point to monitor to detect communications failures corresponding to communications devices using said first access point. In some embodiments, a generated monitoring command commands an access point to monitor for one or more or all of: association failures, authorization failures, DHCP failures, and DNS lookup failures. Monitoring command generation module 806 is configured to generate at least a first monitoring command to configure an Nth access point to monitor to detect communications failures corresponding to communications devices using said Nth access point.

Monitoring command communication module 807 is configured to communicate a generated monitoring command to an access point. For example, monitoring command communication module 807 is configured to communicate at least a first monitoring command to configure a first access point to monitor to detect communications failures corresponding to communications devices using the first access point.

In some embodiments, the first monitoring command is a command instructing the access point to monitor to detect a specified communications failure corresponding to any communication device using the access point. In some embodiments, the first monitoring command is a command instructing the access point to monitor to detect a specified communications failure corresponding to a specified communication device using the access point. In some embodiments, the first monitoring command is a command instructing the access point to monitor for packets corresponding to a specific portion of a communications operation.

Failure notification command generation module 826 is configured to generate notification commands to configure access points to notify the network monitoring mode of a detected failure. For example, failure notification command generation module 826 is configured to generate at least a first notification command to configure a first access point to notify the network monitoring node of a detected failure. Failure notification command communication module 827 is configured to communicate generated notification commands to configure access points to notify the network monitoring mode of detected failures. For example, failure notification command communication module 827 is configured to communicate at least a first notification command to configure the first access point to notify the network monitoring mode of a detected failure.

First packet capture instruction generation module 840 is configured to generate packet capture instructions for an access point to configure the access point to capture and buffer packets corresponding to communications devices using the access point. For example, first packet capture instruction generation module 840 is configured to generate instructions for a first access point to configure said first access point to capture and buffer packets corresponding to communications devices using said first access point.

First packet capture instruction communication module 841 is configured to communicate generated packet captured instructions to an access point. For example, first packet capture instruction communication module 841 is configured to communicate generated packet capture instruction to the first access point to configured the first access point to capture and buffer packets corresponding to communications devices using said first access point. In some embodiments, different access points may, and sometimes are sent different packet capture instructions. In various embodiments, the same access point may be, and sometimes, is send different packet capture instructions at different times, e.g., packet capture instructions are changed dynamically in response to changing events or conditions observed by the network monitoring mode.

Second packet capture instruction generation module 844 is configured to generate packet capture instructions for a particular communications device, said generated packet capture instructions to be sent to multiple access points. For example, second packet capture instruction generation module 844 is configured to generate packet capture instructions for a second communications device, said generated packet capture instructions for the second communications device to be sent to a first set of access point, said first set of access points including multiple access points. In some embodiments the packet capture instructions include instructions to capture packets corresponding to the second communications devices on any interface on which the second communications device communicates with an access point. In some embodiments the packet capture instructions include instructions to forward captured packets corresponding to the second communications device even in the absence of detection of a communications failure corresponding to the second communications device. In some embodiments the packet capture instructions include instructions to capture and forward captured packets corresponding to an indicated portion of a communications activity by the second communications device. In some embodiments the packet capture instructions include instructions to forward captured packets corresponding to the second communications device which are captured after the second communications device has achieved successful Internet connectivity, but not before that point in some embodiments.

As another example, second packet capture instruction generation module 844 is configured to generate packet capture instruction for an Xth communications device, said generated packet capture instructions for the Xth communications device to be sent to a second set of access point, said second set of access points including multiple access points. The second set of access point may be the same or different from the first set of access points.

Second packet capture instruction communication module 845 is configured to communicate generated packet captured instructions for a particular communications device to multiple access points. For example, second packet capture instruction communication module 845 is configured to communicate generated packet capture instruction for a second communications device to a first set of access points, said first set of access points including multiple access points. As another example, second packet capture instruction communication module 845 is configured to communicate generated packet capture instruction for an Xth communications device to a second set of access points, said second set of access points including multiple access points.

Failure notification message receive module 845 is configured to receive an event failure notification message from an access point, e.g., a first access point, which has detected a failure corresponding to a communications device, e.g., a first communications device, using said access point, said event failure notification message including information indicating the type of detected failure.

Buffered packet receive module 849 is configured to receive forwarded captured packets, corresponding to the communications device, e.g., the first communications device to which a detected failure corresponds, e.g., the detected failure reported in a corresponding received failure notification message. The forwarded captured packets have been sent by an access point, which detected the failure. Buffered packet receive module 849 is further configured to receive forwarded captured packets corresponding to an identified communication device, e.g., a second communications device, the packets have been sent irrespective of whether or not a failure was detected corresponding to the identified communications device, e.g., in accordance with previous instructions from the network monitoring node identifying the communications device and requesting that packets from the device be sent if detected.

Analysis module 851, e.g., captured packet evaluation module, processes received event failure notification messages and corresponding forwarded captured packets, as well as received forwarded captured packets corresponding to identified communications devices to: detect failures, identify a type or a classification of a detected failure, detect anomalies, detect potential failures, determine failure sources, e.g., a particular node, a particular link, a particular device, a particular interface on a particular device, a particular WLAN, a device misconfiguration, a bad configuration, poor air link channel quality, and failure frequency, make replacement decisions, and/or make redundancy management decisions. Analysis module 851 includes a DHCP server misconfiguration detection module 855, a timeout driven authentication failure detection module 857, a configuration problem detection module 859, a device failure detection module 861, a WLAN failure detection module 863, and an anomaly detection module 865. DHCP server misconfiguration detection module 855 is configured to detect, e.g., dynamically detect, that a DHCP server is misconfigured. Timeout driven authentication failure detection module 857 is configured to detect, e.g., dynamically detect, that a large number, e.g., a number over a predetermined threshold, of authentication failures are driven by timeouts during hand shakes, e.g., as a result of poor coverage, failure and retries. Configuration problem detection module 859 is configured to detect, e.g., dynamically detect, that authentication failures or DHCP failures are related to WLAN and/or S SID configuration, e.g., a bad VLAN or bad server IP. Device failure detection module 861 is configured to detect, e.g., dynamically detect, that failures are correlated to a single device while other devices are working properly. WLNA failure detection module 863 is configured to detect, e.g., dynamically detect, that failures are correlated to a single WLAN while other WLANs are working properly. Anomaly detection module 865 is configured to detect anomalies based of analysis of stored packet capture over a long time period, e.g., hours or days. In some embodiments, anomaly detection module 865 detects subtle and/or intermittent failures based on long term analysis of captured packets and, in some embodiments, detected statistical changes, e.g., degradation, trending, etc., of one or more performance metrics corresponding to a device, node, network, or interface.

Corrective action module 853 is configured to take corrective actions in response to the determination of the analysis module 851, e.g., generate and send a notification, command and/or control message to implement a corrective action and improve performance in the communications network. Corrective action module 853 includes a DHCP reconfiguration module 867, an air link channel quality control module 869, a network administrator notification module 871, a device reboot module 873, a WLAN reboot module 875, an a detected anomaly notification module 877. DHCP reconfiguration module 867 is configured to generate and send a command and/or notification to reconfigure an identified DHCP server in response to a detection, e.g., by module 855, that a particular DHCP server is misconfigured. Air link channel quality control module 869 is configured to generate and send control messages to improve air link channel quality in response to a detection, e.g., by module 857, that a large number, e.g., over a predetermined threshold, of authentication failures are driven by timeouts during handshakes, e.g., as a result of poor coverage, failure and/or retries. In some embodiments, air link quality control module 869 uses radio management software to modify transmission power, e.g., of an access point and/or of a user equipment device, and/or modify an air link channel to improve air link quality. Network administrator notification module 871 is configured to generate and send an anomaly detection notification to a network administrator in response to detection, e.g., by module 859, that authentication failures or DHCP failures are related to a WLAN and/or SSID configuration, e.g., there is a suspected bad WLAN or a suspected bad server IP. Device reboot module 873 is configured to generate and send a command to reboot a device to which failures are correlated in response to a detection, e.g., by module 4013, that failures are correlated to a single device while other devices are working properly. WLAN reboot module 875 is configured to generate and send a command to reboot an access point of a set of access points, corresponding to a WLAN to which failures are correlated, in response to detection, e.g., by module 863, that failures are correlated to a single WLAN while other WLANs are working properly. Detected anomaly notification module 877 is configured to generate and send a notification to a network administrator of a detected anomaly based on long term, e.g., hours or days, packet capture analysis, in response of a detected anomaly, e.g., by module 865, based on analysis of stored packet capture over a long time period. In some embodiments, corrective action module 853 generates and sends a command to shut down and/or replace a particular suspect device, e.g., a suspected faulty access point. In some embodiments, corrective action module 853 generates and sends a command to switch to a back up unit, e.g., a node may include a primary access point and a secondary, e.g., back-up access point. In some embodiments, corrective action module 853 generates and sends a command to control an access point to cease operation on a particular one of a plurality of alternative interfaces, e.g. shut down a WiFi interface, in the access point. In some embodiments, corrective action module 853 generates and sends a command instructing replacement of a portion of n node, e.g. replace a portion of an access point corresponding to a particular interface which is suspect, e.g., replace a Bluetooth circuit card in an access point including WiFi, Bluetooth and BLE interfaces.

Figure 6A:
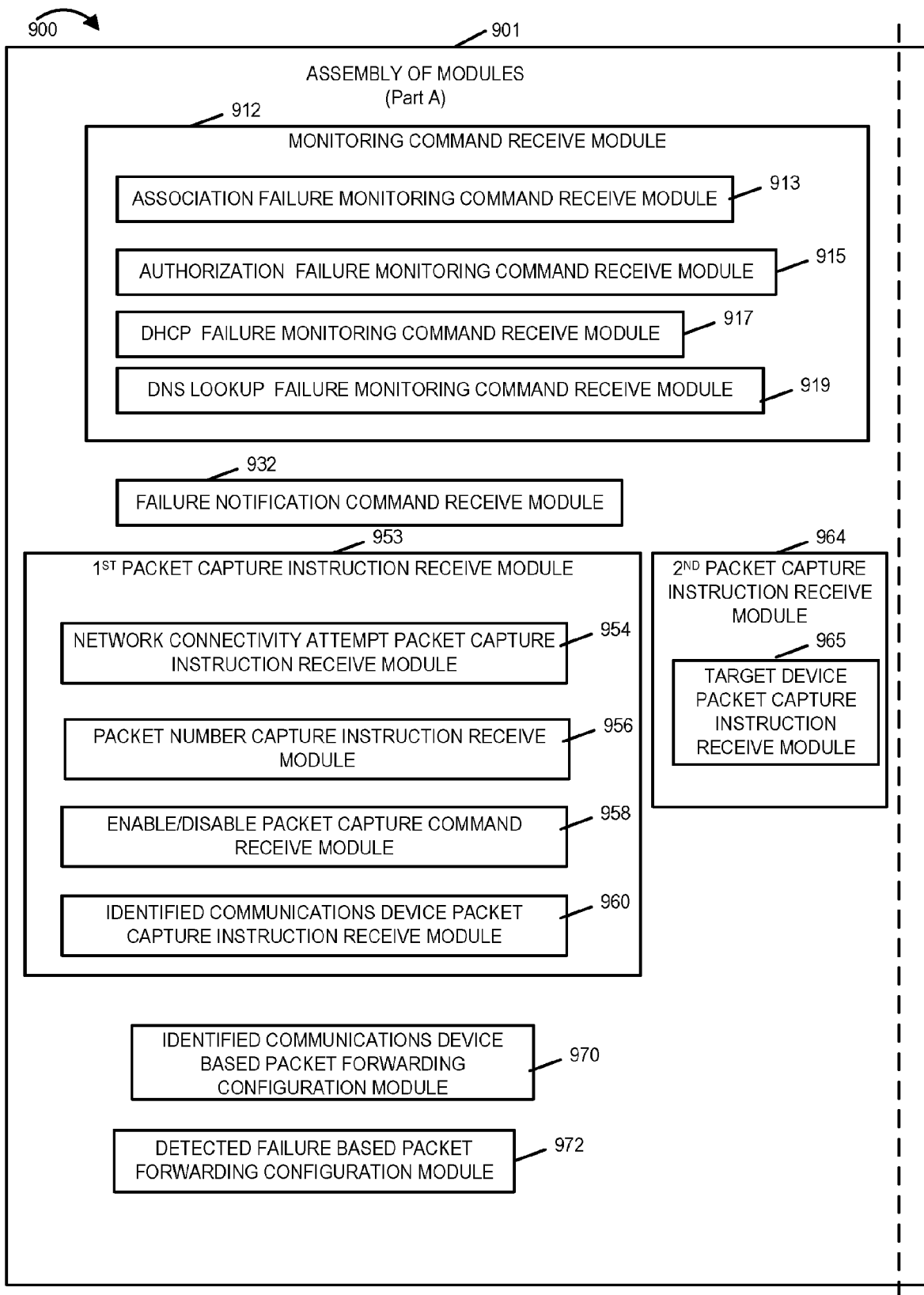
FIG. 6A is a first part of assembly of modules which may be included in an exemplary access point in accordance with an exemplary embodiment.

FIG. 6, comprising the combination of FIG. 6A and FIG. 6B, is a drawing 900, comprising the combination of Part A 901 and Part B 903, of an exemplary assembly of modules 900 in accordance with an exemplary embodiment. In some embodiments, assembly of modules 900 is included in an access point, e.g., a wireless access point, e.g., access point 300 of FIG. 3, base station 1 132 of FIG. 1 or base station M 132' of FIG. 1 or access point 126 of FIG. 1, implemented in accordance with an exemplary embodiment.

The modules in the assembly of modules 900 can, and in some embodiments are, implemented fully in hardware within a processor, e.g., processor 306, e.g., as individual circuits. The modules in the assembly of modules 900 can, and in some embodiments are, implemented fully in hardware within an assembly of modules, e.g., assembly of modules 308, external to the processor, e.g., as individual circuits corresponding to the different modules. In other embodiments some of the modules are implemented, e.g., as circuits, within the processor with other modules being implemented, e.g., as circuits within and assembly of modules, external to and coupled to the processor. As should be appreciated the level of integration of modules in the processor and/or with some modules being external to the processor may be one of design choice.

Alternatively, rather than being implemented as circuits, all or some of the modules may be implemented in software and stored in the memory of a device, with the modules controlling operation of device to implement the functions corresponding to the modules when the modules are executed by a processor. In some such embodiments, the assembly of modules 900 is included in a memory, e.g., assembly of modules 318 in memory 312. In some such embodiments, the assembly of modules is included as part of the routines in memory. In still other embodiments, various modules in assembly of modules 900 are implemented as a combination of hardware and software, e.g., with another circuit external to the processor providing input to a processor which then under software control operates to perform a portion of a module's function. While shown in various embodiments as a single processor, e.g., computer, it should be appreciated that the processor may be implemented as one or more processors, e.g., computers.

When implemented in software the modules include code, which when executed by the processor, configure the processor to implement the function corresponding to the module. In embodiments where the assembly of modules 900 is stored in memory, the memory is a computer program product comprising a computer readable medium comprising code, e.g., individual code for each module, for causing at least one computer, e.g., a processor, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 6 control and/or configure the device or elements therein such as a processor, to perform the functions of corresponding steps illustrated in a method, e.g., steps of the method of flowchart 400 of FIG. 4.

Assembly of modules 900 includes a monitoring command receive module 912, a failure notification command receive module 932, a first packet capture instruction receive module 953, a second packet capture instruction receive module 964, an identified communications device based packet forwarding configuration module 970, a detected failure based packet forwarding configuration module 972, a packet capture module 976, a captured packet buffering module 978, a communications failure monitoring module 980, an identified device packet detection module 982, an identified device packet forwarding module 9981, an event failure notification generation module 986, an event failure notification communication module 988, a detected failure packet forwarding module 990, and a packet buffering stop determination module 982.

Monitoring command receive module 912 is configured to operate the access point to receive configuration information from a network monitoring node indicating communications failures that the access point is to monitor to detect, e.g., on a per access point interface basis. Monitoring command receive module 912 includes an association failure monitoring command receive module 913 configured to receive information indicating that the first access point is to monitor for association failures, an authorization failure monitoring command receive module 915 configured to receive information indicating that the access point is to monitor for authorization failures, a DHCP failure monitoring command receive module 917 configured to received information indicating that the access point is to monitor for authorization failures, and a DSN lookup failure monitoring command receive module 919 configured to receive information indicating that the access point is to monitor for DNS lookup failures.

Failure notification command receive module 932 is configured to operate the access point to receive from a network monitoring node one or more notification commands including a least a first notification command, said first notification command being a command to configured the access point to notify the network monitoring node of a detected failure.

First packet capture instruction receive module 953 is configured to operate the access point to receive capture instruction information from the network monitoring node. First packet capture instruction receive module 953 includes a network connectivity attempt packet capture instruction receive module 954, a packet number capture instruction receive module 956, an enable/disable packet capture command receive module 958, and an identified communications device packet capture instruction receive module 960. Network connectivity attempt packet capture instruction receive module 954 is configured to operate the first access point to receive, from the network monitoring node, information indicating a number of broadcast and multicast packets correspond to a communications device to capture during an attempt by the communications device to achieve network connectivity. Packet number capture instruction receive module 956 is configured to operate the access point to receive, from the network monitoring device, information indicating a total number of packets and an indicator or the length of packets to be captured and buffered for each communications device using the access point. Enable/disable packet capture command receive module 958 is configured to operate the access point to receive, from the network monitoring node, a command used to enable or disable packet capture at the access point. Identified communications device packet capture instruction receive module 960 is configured to operate the access point to receive an instruction to capture packets for an identified communications device on multiple different interfaces.

Second packet capture instruction receive module 964 is configured to operate the access point to receive from the network monitoring node packet capture instruction for a particular communications device, e.g., a second communication device. In some such embodiment, said packet capture instruction for a particular communications device, which are received were directed to multiple access points. Second packet capture instruction receive module 964 includes a target device packet capture instruction receive module 965. Target device packet capture instruction receive module 965 is configured to receive packet capture instruction corresponding to a particular communications device, e.g., a second communications device, being targeted by the network monitoring device, e.g., in response to suspected intermittent failure condition with the second communications device.

Identified communications device based packet forwarding configuration module 970 is configured to configured to the access point to forward captured packets corresponding to one or more identified communications devices, e.g., the second communications device, to the network monitoring node irrespective of whether or not a communications failure correspond to an identified communications device is detected. Detected failure based packet forwarding configuration module 972 is configured to configure the access point to forward captured packets corresponding to communications devices for which communications failures are detected without forwarding packets corresponding to communications devices for which communications failures are not detected and which are not identified communications device for which packets are to be forwarded to the network monitoring node irrespective of the failure status. Thus module 972 configures the access point to selectively forward captured packets based on failure detection, while module 970 configures the access point to selectively forward captured packed based on target device identification, e.g., with the network monitoring node having previously selected the target communications devices. In some embodiments, further condition are imposed by the network monitoring mode for the selective packet forwarding, e.g. during a particular phase of communications device operation which is of interest to the network monitoring node.

Packet capture module 976 is configured to operate the access point to capture packets corresponding to communications devices used the access point. Captured packet buffering module 978 is configured to store captured packets in a buffer, e.g., in memory in the access point.

Communications failure monitoring module 980 is configured to operate the access point to monitor to detect communications failures corresponding to communications devices using the access point. Communications failure monitoring module 980 includes an association failure detection module 981 configured to monitor for and detect association failures, an authorization failure detection module 983 configured to monitor for and detect authorization failures, a DHCP failure detection module 985 configured to monitor for and detect DHCP failures and a DNS lookup failure detection module 987 configured to monitor for and detect DNS lookup failures. In some embodiments, which ones of the modules 981, 983, 985 and 987 are used are a function of monitoring command information previously received from the network monitoring node, e.g., which is used to configure the access point.

Identified device packet detection module is configured to operate the access point to monitor to detect packets corresponding to one or more identified communications devices(s), e.g., a second communications device, for which packets are to be forwarded irrespective of failure detection. Identified device packet forwarding module 9981 is configured to operate the access point to forward captured packets corresponding to an identified communications device to the network monitoring node irrespective of whether or not a failure corresponding to the identified communications device is detected.

Event failure notification generation module 986 is configured to generate at the access point, an event failure notification indicating the type of detected failure, said generating being in response to detecting a communications failure corresponding to a communications device, e.g., a first communications device, using said access point. In various embodiments, the format of the event failure notification is in accordance with information previously received in a notification command from the network monitoring node. In some embodiments, the type of failure is one of an: an association failure, an authorization failure, a DHCP failure and a DNS lookup failure. In some embodiments, the event notification information includes a failure log corresponding to the event, said failure log including information known to the access node which is useful to troubleshoot the failure. Event failure notification communication module 988 is configured to send from the first access point a generated event failure notification to the network monitoring node. Detected failure packet forwarding module 990 is configured to forward captured packets, corresponding to the device to which the detected communications failure corresponds, e.g., the first communications device, to the network monitoring mode. In some embodiments, detected failure packet forwarding module 990 forwards captured packets along with an event failure notification or included within an event failure notification.

Packet buffering stop determination module 992 determines if a packet buffering stop criteria for potential failure has been reached for a communications device, e.g., has Internet access been achieved, and controls operation as a function of the determination.

Stored packet deletion module 994 is configured to delete, in response to a packet buffering stop criteria being reached, stored captured packets corresponding to a communication device which were stored prior to the packet buffering stop criteria being reached. Stored packet deletion module 994 includes a successful DNS lookup based communication stored packet deletion module 996. Successful DNS lookup based communication stored packet deletion module 996 is configured to delete, upon successful completion of a SNS lookup by a communications device, stored packets corresponding to the communications device which were stored prior to the SNS lookup.

Assembly of modules 900 further includes a corrective action message receive module 9991, a radio management module 9993, a backup control module, an interface deactivation module 9997, and a reboot module. Corrective action receive module 9991 is configured to receive corrective action messages from a network monitoring node, e.g., corrective action messages notifying the access point of a detected problem, and/or commanding or controlling the access point to implement a corrective action, e.g., (i) shut down the access point for service, (ii) reboot the access point, (iii) shut down, e.g., deactivate, a particular interface, e.g., one of a plurality of alternative wireless interfaces supported by the access point, (iv) reboot a particular interface, (v) deny service to a particular user equipment device, (vi) switch to a backup unit, e.g., a redundant access point included in the device, backup interface, backup power supply, back-up receiver, back-up transmitter, or back-up antenna, (vii) perform commanded or suggested radio management operations to improve air link quality. Radio management module 9993 is configured to implement radio management commands or instructions, e.g., changing a transmission power level of the access point or controlling a UE device using the access point to change its transmission power to improve air link channel quality, in response to received commands from a network monitoring node. Backup control module 9995 is configured to switch to a backup device, e.g., a redundant circuit or interface, within the access point, in response to a command from the network monitoring node. Interface deactivation module 9997 is configured to deactivate, e.g., shut down a particular wireless interface, e.g., shut down the BLE interface, within the access point, in response to a command from the network monitoring node. Reboot module 9999 is configured to reboot the access point or reboot a portion of the access point, e.g., a particular identified wireless interface, in response to a received command from the network monitoring node.

FIG. 7 is a drawing of an exemplary communications device 700, e.g., user equipment device such as a wireless terminal in accordance with an exemplary embodiment. Exemplary communications device 700 is, e.g., UE device 1 134, UE N 134, UE H1 128, or UE HZ 130 of system 100 of FIG. 1. Communications device 700 includes a wired interface 702, wireless interfaces 704, a processor 706, e.g., a CPU, a display 708, an input device 710, e.g., touchscreen, keypad, switches, etc., memory 712 and an assembly of modules 716, e.g., assembly of hardware modules such as an assembly of circuits, coupled together via a bus 718 over which the various elements may interchange data and information. Memory 712 includes routines 713 including an assembly of modules 715, e.g., an assembly of software modules, and data/information 715. Wired interface 702, e.g., an Ethernet interface, includes a receiver 720 and a transmitter 722. Wireless interfaces 704 includes a cellular interface 724, a WiFi interface 726, e.g., an 802.11 interface, a Bluetooth interface 728, and a BLE interface 730. Cellular interface includes a cellular receiver 732 coupled to receive antenna 750 via which the communications device receives cellular signals. Cellular interface 724 includes a cellular transmitter 734 coupled to transmit antenna 752 via which the communications device 700 transmits cellular signals.

WIFI interface 726 includes a WIFI receiver 736, e.g., an 802.11 receiver, coupled to receive antenna 750 via which the communications device receives WIFI signals. WIFI interface 726 includes a WIFI transmitter 738 coupled to transmit antenna 752 via which the communications device 700 transmits WIFI signals.

Bluetooth interface 728 includes a Bluetooth receiver 740 coupled to receive antenna 750 via which the communications device receives Bluetooth signals. Bluetooth interface 728 includes a Bluetooth transmitter 742 coupled to transmit antenna 752 via which the communications device 700 transmits Bluetooth signals. BLE interface 730 includes a BLE receiver 744 coupled to receive antenna 750 via which the communications device receives BLE signals. BLE interface 730 includes a BLE transmitter 746 coupled to transmit antenna 752 via which the communications device 700 transmits BLE signals. In some embodiments, the same antenna is used for receiving and transmitting signals. In some embodiments, different antennas are used corresponding to at least some different wireless interfaces.

List of Exemplary Numbered Method Embodiments

Method Embodiment 1. A method of capturing and providing information relating to communications, the method comprising:
operating a first access point to capture packets corresponding to communications devices using said first access point;
operating the first access point to monitor to detect communications failures corresponding to communications devices using said access point; and
in response to detecting a communications failure corresponding to a first communications device, generating, at the first access point, an event failure notification indicating the type of detected failure; and
sending, from the first access point, the event failure notification to a network monitoring node.

Method Embodiment 2. The method of numbered method embodiment 1, wherein said first access point is a wireless access point.

Method Embodiment 3. The method of claim 2, wherein said communications devices are wireless devices.

Method Embodiment 4. The method of numbered method embodiment 1, further comprising:
in response to detecting said communications failure corresponding to said first communications device, further performing the step of forwarding captured packets corresponding to the first communications device to which the detected communications failure corresponds, to said network monitoring node.

Method Embodiment 5. The method of numbered method embodiment 1, further comprising:
upon successful completion of a DNS lookup by a communications device deleting the stored packets corresponding to the communications device which were captured and stored prior to the DNS lookup.

Method Embodiment 6. The method of numbered method embodiment 5, wherein said communications device is a wireless terminal.

Method Embodiment 7. The method of numbered method embodiment 1, wherein said first access point is configured to forward captured packets corresponding to communications devices for which communications failures are detected without forwarding captured packets corresponding to communications devices using said first access point for which communications failures are not detected.

Method Embodiment 8. The method of numbered method embodiment 1, further comprising:
operating the first access point to receive configuration information from said network monitoring node indicating communications failures said first access point is to monitor to detect.

Method Embodiment 9. The method of numbered method embodiment 8,
wherein said first access point includes multiple different interfaces; and
wherein said information from said network monitoring node indicating communications failures said first access point is to monitor for is provided on a per access point interface basis.

Method Embodiment 10. The method of numbered method embodiment 8, wherein said multiple different interfaces includes two different wireless interfaces.

Method Embodiment 11. The method of numbered method embodiment 9, wherein said information indicating communications failures said first access point is to monitor include one or more of: association failures, authentication failures, authorization failures, DHCP failures, and DNS look up failures.

Method Embodiment 12. The method of numbered method embodiment 11, further comprising:
operating the first access point to receive, from the network monitoring node, information indicating a number of broadcast and multicast packets corresponding to a communications device to capture during an attempt by the communications device to achieve network connectivity.

Method Embodiment 13. The method of numbered method embodiment 12, further comprising:

operating the first access point to receive, from the network monitoring node, information indicating a total number of packets and an indicator of the length of packets to be captured and buffered for each communications device using the first access point.

Method Embodiment 14. The method of numbered method embodiment 13, further comprising:
operating the first access point to receive, from the network monitoring node, a command used to enable or disable packet capture at the first access point.

Method Embodiment 15. The method of numbered method embodiment 13, further comprising:
operating the first access point to receive an instruction to capture packets for an identified communications device on multiple different interfaces; and
operating the first access point to forward captured packets corresponding to the identified communications device to the network monitoring mode irrespective of whether or not a communications failure corresponding to the identified communications device is detected.

Method Embodiment 16. The method of numbered method embodiment 15, wherein the identified communications device is a multi-mode communications device and wherein a communications failure on a first interface causes said identified communications device to switch to a second interface.

Method Embodiment 17. The method of numbered method embodiment 16, wherein said first and second interfaces are different type wireless interfaces.

Method Embodiment 18. The method of numbered method embodiment 1, further comprising:
operating the network node to communicate packet capture instructions to said first access point to configure said first access point to capture and buffer packets corresponding to communications devices using said first access point; and
operating the network monitoring node to communicate at least a first monitoring command to configure the first access point to configure the first access point to monitor to detect communications failures corresponding to communications devices using said first access point.

Method Embodiment 19. The method of numbered method embodiment 18, further comprising:
operating the network monitoring node to communicate at least a first notification command to configure the first access point to notify the network monitoring mode of a detected failure.

Method Embodiment 20. The method of numbered method embodiment 1 wherein the first monitoring command is a command instructing the first access point to monitor to detect a specified communications failure corresponding to any communications device using the first access point.

Method Embodiment 21. The method of numbered method embodiment 1 wherein the first monitoring command is a command instructing the first access point to monitor to detect a specified communications failure corresponding to a specific communications device which may use the first access point.

Method Embodiment 22. The method of numbered method embodiment 1 wherein the first monitoring command is a command instructing the first access point to monitor to for packets corresponding to a specific portion of a communications operation (e.g., post Internet connection) and a specific communications device (this allows for packet capture and reporting for specific wireless terminals and specific portions of a communications session even when errors have not been detected to facilitate detection of problems which when considered at the time were by themselves not clearly indicative of a problem or error but which when viewed over time may be indicative of an error with a particular portion of a communications session, e.g., a device may repeatedly drop connections on an interface and connect to another interface shortly after successful connection establishment because of errors or problems with the interface/communications like associated with the interface such as a time out setting being shorter than appropriate).

Method embodiment 23. The method of numbered method embodiment 15, further comprising:
operating the network monitoring node to communicate packet capture instructions for a second communications device to multiple access points.

Method embodiment 24. The method of numbered method embodiment 23, wherein said packet capture instructions include instructions to capture packets corresponding to the second communications device on any interface on which said second communications device communicates with an access point.

Method embodiment 25. The method of numbered method embodiment 24, wherein said packet capture instructions include instructions to forward captured packets corresponding to the second communications device even in the absence of detection of a communications failure corresponding to the second communications device.

Method Embodiment 26. The method of numbered method embodiment 24, wherein said packet capture instructions include instructions to capture and forward packets corresponding to an indicated portion of a communications activity by the second communications device.

Method embodiment 27. The method of numbered method embodiment 24, wherein said packet capture instructions include instructions to forward captured packets corresponding to the second communications device which are captured after the second communications device has achieved successful Internet connectivity (but not before that point in some embodiments).

List of Exemplary Numbered System Embodiments

System Embodiment 1. A communications system comprising:
a first access point including a first processor configured to:
 operate the first access point to capture packets corresponding to communications devices using said first access point;
 operate the first access point to monitor to detect communications failures corresponding to communications devices using said access point; and
 generate, at the first access point, an event failure notification indicating the type of detected failure, in response to detecting a communications failure corresponding to a first communications device; and
 send, from the first access point, the event failure notification to a network monitoring node.

System embodiment 2. The communications system of numbered system embodiment 1, wherein said first access point is a wireless access point.

System Embodiment 3. The communications system of numbered system embodiment 2, wherein said communications devices are wireless devices.

System Embodiment 4. The communication system of numbered system embodiment 1, wherein said first processor is further configured to:

perform the step of forwarding captured packets corresponding to the first communications device to which the detected communications failure corresponds, to said network monitoring node, in response to detecting said communications failure corresponding to said first communications device, further performing the step of forwarding captured packets corresponding to the first communications device to which the detected communications failure corresponds, to said network monitoring node.

System Embodiment 5. The communications system of numbered system embodiment 1, wherein said first processor is further configured to:

delete the stored packets corresponding to the communications device which were captured and stored prior to the DNS lookup, upon successful completion of a DNS lookup by a communications device.

System Embodiment 6. The communications system of numbered system embodiment 6, wherein said communications device is a wireless terminal.

System Embodiment 7. The communications system of numbered system embodiment 1, wherein said first processor is configured to forward captured packets corresponding to communications devices for which communications failures are detected without forwarding captured packets corresponding to communications devices using said first access point for which communications failures are not detected.

System Embodiment 8. The communications system of numbered system embodiment 1, wherein said first processor is further configured to:

operate the first access point to receive configuration information from said network monitoring node indicating communications failures said first access point is to monitor to detect.

System Embodiment 9. The communications system of numbered system embodiment 8, wherein said first access point includes multiple different interfaces; and wherein said information from said network monitoring node indicating communications failures said first access point is to monitor for is provided on a per access point interface basis.

System Embodiment 10. The communications system of numbered system embodiment 8, wherein said multiple different interfaces includes two different wireless interfaces.

System Embodiment 11. The communications system of numbered system embodiment 9, wherein said information indicating communications failures said first access point is to monitor include one or more of: association failures, authentication failures, authorization failures, DHCP failures, and DNS look up failures.

System Embodiment 12. The communications system of numbered system embodiment 11, wherein said first processor is further configured to:

operate the first access point to receive, from the network monitoring node, information indicating a number of broadcast and multicast packets corresponding to a communications device to capture during an attempt by the communications device to achieve network connectivity.

System Embodiment 13. The communications system of numbered system embodiment 12, wherein said first processor is further configured to:

operate the first access point to receive, from the network monitoring node, information indicating a total number of packets and an indicator of the length of packets to be captured and buffered for each communications device using the first access point.

System Embodiment 14. The communications system of numbered system embodiment 13, wherein said first processor is further configured to:

operate the first access point to receive, from the network monitoring node, a command used to enable or disable packet capture at the first access point.

System Embodiment 15. The communications system of numbered system embodiment 13, wherein said first processor is further configured to:

operate the first access point to receive an instruction to capture packets for an identified communications device on multiple different interfaces; and operate the first access point to forward captured packets corresponding to the identified communications device to the network monitoring mode irrespective of whether or not a communications failure corresponding to the identified communications device is detected.

System Embodiment 16. The communications system of numbered system embodiment 15, wherein the identified communications device is a multi-mode communications device and wherein a communications failure on a first interface causes said identified communications device to switch to a second interface.

System Embodiment 17. The communications system of numbered system embodiment 16, wherein said first and second interfaces are different type wireless interfaces.

System Embodiment 18. The communications system of numbered system embodiment 1, further comprising:

a network node, said network node including a second processor configured to:

operate the network node to communicate packet capture instructions to said first access point to configure said first access point to capture and buffer packets corresponding to communications devices using said first access point; and operate the network monitoring node to communicate at least a first monitoring command to configure the first access point to configure the first access point to monitor to detect communications failures corresponding to communications devices using said first access point.

System Embodiment 19. The communications system of numbered system embodiment 18, wherein said second processor is further configured to: operate the network monitoring node to communicate at least a first notification command to configure the first access point to notify the network monitoring mode of a detected failure.

System Embodiment 20. The communications system of numbered system embodiment 1 wherein the first monitoring command is a command instructing the first access point to monitor to detect a specified communications failure corresponding to any communications device using the first access point.

System Embodiment 21. The communications system of numbered system embodiment 1 wherein the first monitoring command is a command instructing the first access point to monitor to detect a specified communications failure corresponding to a specific communications device which may use the first access point.

System Embodiment 22. The communications system of numbered system embodiment 1 wherein the first monitoring command is a command instructing the first access point to monitor to for packets corresponding to a specific portion of a communications operation (e.g., post Internet connection) and a specific communications device (this allows for packet capture and reporting for specific wireless terminals and specific portions of a communications session even when errors have not been detected to facilitate detection of problems which when considered at the time were by themselves not clearly indicative of a problem or error but which when viewed over time maybe indicative of an error with a particular portion of a communications session, e.g., a device may repeatedly drop connections on an interface and connect to another interface shortly after successful connection establishment because of errors or problems with the interface/communications like associated with the interface such as a time out setting being shorter than appropriate).

System Embodiment 23. The communications system of numbered system embodiment 15, wherein said second processor is further configured to:

operate the network monitoring node to communicate packet capture instructions for a second communications device to multiple access points.

System Embodiment 24. The communications system of numbered system embodiment 23, wherein said packet capture instructions include instructions to capture packets corresponding to the second communications device on any interface on which said second communications device communicates with an access point.

System Embodiment 25. The communications system of numbered system embodiment 24, wherein said packet capture instructions include instructions to forward captured packets corresponding to the second communications device even in the absence of detection of a communications failure corresponding to the second communications device.

System Embodiment 26. The communications system of numbered system embodiment 24, wherein said packet capture instructions include instructions to capture and forward packets corresponding to an indicated portion of a communications activity by the second communications device.

System Embodiment 27. The communications system of numbered system embodiment 24, wherein said packet capture instructions include instructions to forward captured packets corresponding to the second communications device which are captured after the second communications device has achieved successful Internet connectivity, but not before that point in some embodiments.

In some embodiments a system administrator can turn off the always on automatic packet capture and upload on detected failures functionality at one or more access points and then and then turn it on after an anomaly is detected or reported such as a certain protocol failure by one or more devices using the access point or access points.

In some embodiments network management software, e.g., backend software, running on a management server performing analytics on one or more client events detects that there is a cluster of DHCP failures on a particular subnet of the network. The server then enables the dynamic packet capture functionality on the access points for the given subnet where DHCP failures were detected and, collects and analyzes the packets. After packet collection and/or analysis the server signals the access points to turn off auto capture of packets.

In other cases a system administrator may have a set of configured dynamic packet capture options set, e.g., with packets to be captured and forwarded in the event of one or more detected failure conditions at an access point. In such an embodiment software on a management server in the network can detect that a group of client devices with a specific OS type are having application specific problems that are not covered by the standard capture configuration (e.g. capture on auth fail, capture on DHCP fail etc. and can modify the packet capture and reporting conditions to facilitate collection of packets which are likely to be useful in further analysis to be preformed to identify the problem. The management server in such an embodiment can send a list of client mac addresses (MAC addresses of client devices to be monitored) across the devices, e.g., access points, in a site or network and instruct the Access points to capture packets, e.g., a specific number of packets, for a given application executed by a client device having one of the listed mac addresses and thereby dynamically identify and control the capture packet data for further analysis and root problem cause evaluation for devices having MAC addresses or other device identifiers in the distributed list.

Management software operating on a network server or other device can also identify that the given known problem is related to clients connecting on a specific SSID/WLAN and control packet capture and reporting for devices using the specific SSID ore WAN. The server can and sometimes does dynamically sends configuration control instructions and/or information to access points to turn on capture and reporting for the given SSID and/or WLAN.

The techniques of various embodiments may be implemented using software, hardware and/or a combination of software and hardware. Various embodiments are directed to apparatus, e.g., management entities, e.g., a network monitoring node, routers, gateways, access points, DHCP servers, DNS servers, AAA servers, user equipment devices, e.g., mobile nodes such as mobile wireless terminals, base stations, communications networks, communications systems. Various embodiments are also directed to methods, e.g., method of controlling and/or operating a communications device or devices, e.g., a network management node, an access point, wireless terminals (UEs), base stations, control nodes, DHCP nodes, DNS servers, AAA nodes, MMES, networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the invention.

In some embodiments, the processor or processors, e.g., CPUs, of one or more devices, e.g., communications devices such as network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including cellular, WiFi, Bluetooth and BLE, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), WiFi, Bluetooth, BLE, and/or various other types of communications techniques which may be used to provide wireless communications links between access nodes and mobile nodes. In some embodiments the access nodes are implemented as base stations which establish communications links with user equipment devices, e.g., mobile nodes, using WiFi, Bluetooth, BLE, OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method, comprising:
communicating, by a network monitoring node, instructions to configure a device providing one or more communications devices with access to a network to capture packets corresponding to the one or more communications devices using the device and to detect a failure based on the captured packets;
receiving, by the network monitoring node, at least a portion of the captured packets corresponding to the detected failure; and
analyzing the received portion of the captured packets to determine a cause of the detected failure.

2. The method of claim 1, further comprising:
invoking, by the network monitoring node, a corrective action based on determining the cause of the detected failure.

3. The method of claim 1, wherein the instructions configure the device to capture packets corresponding to the one or more communications devices communicated over a first network interface of the device.

4. The method of claim 3, further comprising communicating, by the network monitoring node, second instructions to configure the device to capture packets corresponding to the one or more communications devices communicated over a second network interface of the device, wherein the second network interface is different than the first network interface.

5. The method of claim 3, wherein the first network interface is a wireless interface.

6. The method of claim 1, wherein the device comprises at least one of an access point, a base station, or a gateway device installed at a customer site.

7. The method of claim 1, wherein the network monitoring node is included in a cloud-based implementation of a wireless network management system.

8. The method of claim 1, further comprising receiving, by the network monitoring node, a failure notification indicative of a type of the detected failure.

9. The method of claim 1, further comprising receiving, by the network monitoring node, at least a portion of the captured packets corresponding to an identified communications device irrespective of failure status.

10. The method of claim 1, wherein the instructions include a number of packets to be captured by the device and a length of each packet to be captured by the device for each of the one or more communications devices.

11. The method of claim 1, wherein the instructions include instructions to configure the device to capture packets corresponding to an identified one of the one or more communications devices communicated over multiple different interfaces of the device.

12. A system, comprising:
hardware processing circuitry; and
one or more hardware memories storing instructions that when executed configure the hardware processing circuitry to:
communicate instructions to configure a device providing one or more communications devices with access to a network to capture packets corresponding to the one or more communications devices using the device and to detect a failure based on the captured packets;
receive at least a portion of the captured packets corresponding to the detected failure; and
analyze the received portion of the captured packets to determine a cause of the detected failure.

13. The system of claim 12, wherein the instructions further configure the hardware processing circuitry to:
invoke a corrective action based on determining the cause of the detected failure.

14. The system of claim 12, wherein the instructions further configure the device to capture packets corresponding to the one or more communications devices communicated over a first network interface of the device.

15. The system of claim 12, wherein the device comprises at least one of an access point, a base station, or a gateway device installed at a customer site.

16. The system of claim 12, wherein the network monitoring node is included in a cloud-based implementation of a wireless network management system.

17. The system of claim 12, further comprising receiving, by the network monitoring node, a failure notification indicative of a type of the detected failure.

18. The system of claim 12, further comprising receiving, by the network monitoring node, at least a portion of the captured packets corresponding to an identified communications device irrespective of failure status.

19. A non-transitory computer readable storage medium comprising instructions that when executed configure hardware processing circuitry to perform operations, comprising:
communicating, by a network monitoring node, instructions to configure a device providing one or more communications devices with access to a network to capture packets corresponding to one or more communications devices using the device and to detect a failure based on the captured packets;
receiving, by the network monitoring node, at least a portion of the captured packets corresponding to the detected failure; and
analyzing the received portion of the captured packets to determine a cause of the detected failure.

* * * * *